(12) United States Patent
Yamada et al.

(10) Patent No.: US 12,033,335 B2
(45) Date of Patent: Jul. 9, 2024

(54) MOTION ESTIMATION DEVICE AND MOTION ESTIMATION METHOD USING MOTION ESTIMATION DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yutaka Yamada, Tokyo (JP); Yuichi Oda, Yokohama Kanagawa (JP); Manabu Nishiyama, Tokyo (JP); Yutaka Oki, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 360 days.

(21) Appl. No.: 17/463,401

(22) Filed: Aug. 31, 2021

(65) Prior Publication Data
US 2022/0301189 A1 Sep. 22, 2022

(30) Foreign Application Priority Data
Mar. 22, 2021 (JP) .................................. 2021-047735

(51) Int. Cl.
*G06T 7/246* (2017.01)
(52) U.S. Cl.
CPC .... *G06T 7/248* (2017.01); *G06T 2207/10024* (2013.01); *G06T 2207/20081* (2013.01)
(58) Field of Classification Search
CPC .................................................... G06T 7/248
See application file for complete search history.

(56) References Cited

U.S. PATENT DOCUMENTS

| | | | |
|---|---|---|---|
| 10,871,377 B1 * | 12/2020 | Yu | G06V 20/20 |
| 2019/0007670 A1 | 1/2019 | Sakurai | |
| 2019/0139197 A1 | 5/2019 | Myokan | |
| 2020/0218929 A1 * | 7/2020 | Li | G06F 18/00 |
| 2020/0258250 A1 | 8/2020 | Xiao | |
| 2021/0065379 A1 * | 3/2021 | Zhang | G06V 10/82 |
| 2021/0090269 A1 * | 3/2021 | Troy | G01N 29/265 |

(Continued)

FOREIGN PATENT DOCUMENTS

| | | |
|---|---|---|
| JP | 2006337075 A | 12/2006 |
| JP | 5965293 B2 | 8/2016 |
| JP | 2019011971 A | 1/2019 |

(Continued)

OTHER PUBLICATIONS

Chao Liu et al., "Neural RGB—>D Sensing: Depth and Uncertainty from a Video Camera", 2019 IEEE/CVF Conference on Computer Vision and Pattern Recognition (CVPR), Long Beach, CA, Jun. 20, 2019, URL: https://ieeexplore.ieee.org/document/8953381.

*Primary Examiner* — Oneal R Mistry
(74) *Attorney, Agent, or Firm* — Kim & Stewart LLP

(57) ABSTRACT

According to one embodiment, a motion estimation device includes a first receiving circuit that receives a first input frame and a calculation circuit that performs motion estimation processing on the first input frame. The calculation circuit estimates a distance for each pixel of the first input frame and estimates a reliability of the distance for each pixel of the first input frame based on pixel information of the first input frame.

20 Claims, 18 Drawing Sheets

(56) References Cited

U.S. PATENT DOCUMENTS

2022/0028094 A1\* 1/2022 Bleyer .................... G06T 5/73
2022/0292649 A1\* 9/2022 Wang ..................... G06T 7/269

FOREIGN PATENT DOCUMENTS

| JP | 2020135679 | A | 8/2020 |
|----|------------|---|--------|
| JP | 2021502626 | A | 1/2021 |
| WO | 2017175441 | A1 | 2/2019 |

\* cited by examiner

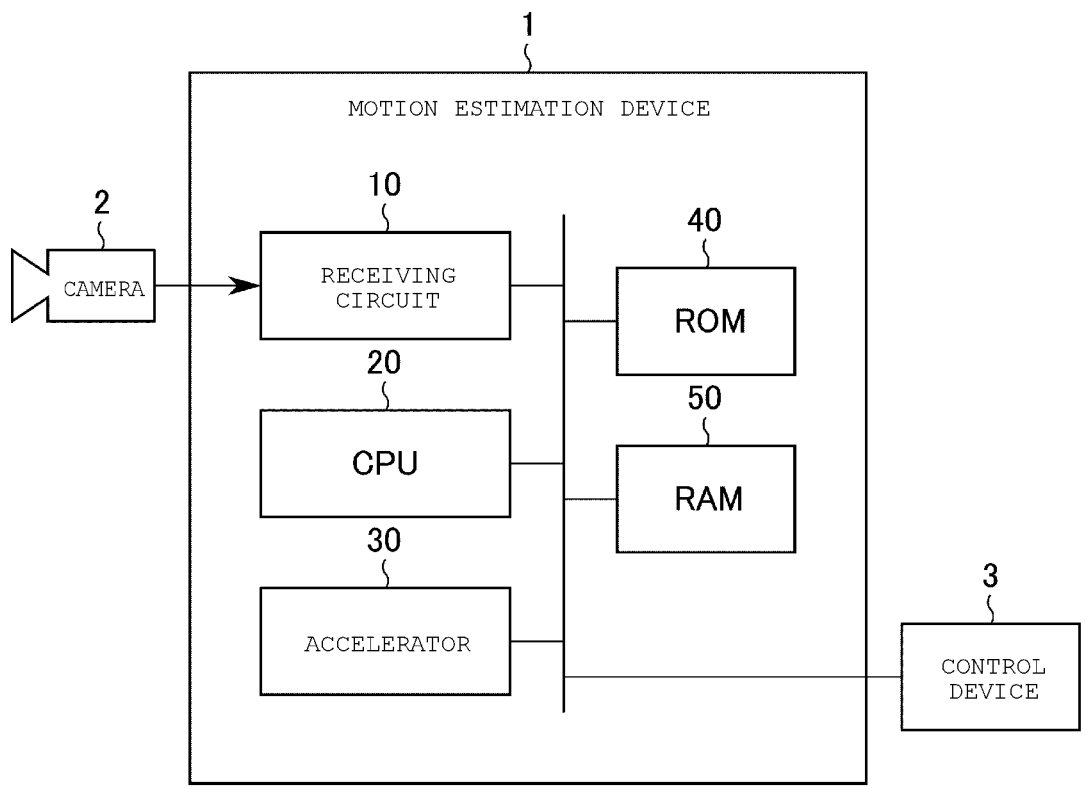
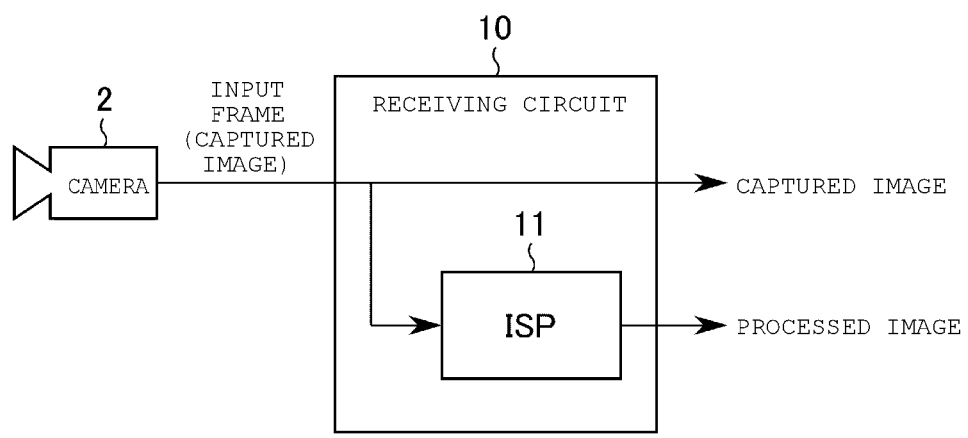

MOTION ESTIMATION DEVICE AND MOTION ESTIMATION METHOD USING MOTION ESTIMATION DEVICE

CROSS-REFERENCE TO RELATED APPLICATION

This application is based upon and claims the benefit of priority from Japanese Patent Application No. 2021-047735, filed Mar. 22, 2021, the entire contents of which are incorporated herein by reference.

FIELD

Embodiments described herein relate generally to a motion estimation device and a motion estimation method using the motion estimation device.

BACKGROUND

A visual simultaneous localization and mapping (Visual SLAM) technique that simultaneously creates an environmental map based on an image captured by a camera and estimates a self-position (the position/orientation of the camera within the environmental map) is known.

BRIEF DESCRIPTION OF THE DRAWINGS

FIG. 1 is a block diagram showing an example of an overall configuration of a motion estimation device according to a first embodiment.

FIG. 2 is a block diagram showing an example of a receiving circuit in a motion estimation device according to a first embodiment.

DETAILED DESCRIPTION

Figure 3:
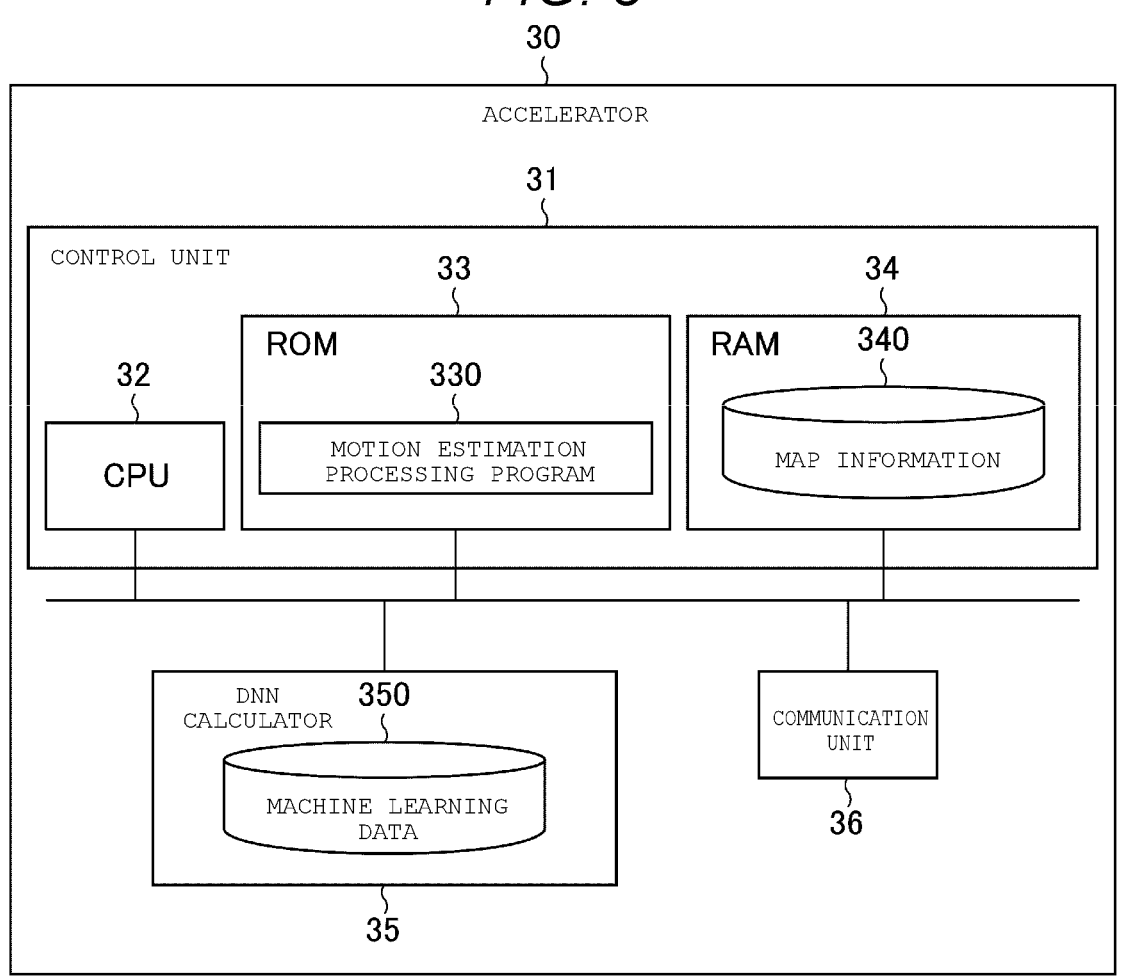
FIG. 3 is a block diagram showing an example of a hardware configuration of an accelerator in a motion estimation device according to a first embodiment.

Embodiments provide a motion estimation device and a motion estimation method using the motion estimation device capable of improving the accuracy of motion estimation.

In general, according to one embodiment, a motion estimation device includes a first receiving circuit that receives a first input frame and a calculation circuit that performs motion estimation processing based on the first input frame. The calculation circuit estimates a distance for each pixel of the first input frame and estimates reliability for the distance of each pixel in the first input frame based on the pixel information of the first input frame.

Hereinafter, certain example embodiments will be described with reference to drawings. In the following description, elements having the same or substantially the same function and configuration are denoted by the same reference symbol.

1. First Embodiment

A motion estimation device according to a first embodiment will be described. The motion estimation device according to the present embodiment is incorporated in, for example, a processor that performs image recognition and may be applied to a vehicle, a robot, an automatic guided vehicle (AGV), a drone, and the like. Hereinafter, a case where the motion estimation device is mounted on the vehicle will be described.

1.1 Configuration 1.1.1 Overall Configuration of Motion Estimation Device

FIG. 1 is a block diagram showing an example of the overall configuration of the motion estimation device according to the first embodiment.

The motion estimation device 1 includes a receiving circuit 10, a central processing unit (CPU) 20, an accelerator 30, a read only memory (ROM) 40, and a random access memory (RAM) 50. The motion estimation device 1 receives, for example, a frame (image) captured by an external camera 2 mounted on the same vehicle as the motion estimation device 1. The frame is received through a bus. In the present embodiment, the camera 2 is a monocular camera. For example, a color camera, a monochrome camera, a near-infrared (NIR) camera, or the like is used as the camera 2. The motion estimation device 1 performs motion estimation based on the frame received from the camera 2 (hereinafter, referred to as "input frame"). In particular, the motion estimation device 1 in the present embodiment estimates the motion (or position) of the camera 2 providing the input frame. When the camera 2 is fixed to a vehicle, the motion/position of the camera 2 can be considered equivalent to the motion/position of the vehicle (perhaps with some fixed offset in position between camera 2 and the nominal vehicle position). The motion estimation device 1 transmits a result of the motion estimation to an external control device 3 (control device 3) through the bus. The control device 3 determines and controls the movement of the vehicle based on, for example, the result of the motion estimation.

The receiving circuit 10 receives an input frame from the camera 2. The receiving circuit 10 transmits the received input frame to a RAM 50.

The CPU 20 controls the operation of the motion estimation device 1. The CPU 20 performs various calculations. The CPU 20 may be a multiprocessor. The CPU 20 may be, for example, a digital signal processor (DSP) or a graphics processing unit (GPU).

The accelerator 30 is a dedicated circuit that performs motion estimation processing using the input frame.

The ROM 40 is a non-volatile memory. The ROM 40 stores, for example, a firmware (program) for the CPU 20 to execute various operations.

The RAM 50 is used as a work area of the CPU 20. The RAM 50 is, for example, a semiconductor memory such as a DRAM or an SRAM. The RAM 50 temporarily stores, for example, the above firmware, the input frame, and data at the time of executing various operations by the CPU 20. The above firmware is loaded from the ROM 40 to the RAM 50 by the CPU 20 immediately after the motion estimation device 1 is powered on, for example.

1.1.2 Configuration of Receiving Circuit 10

FIG. 2 is a block diagram showing an example of the receiving circuit 10 in the motion estimation device 1 according to the first embodiment.

The receiving circuit 10 includes an image signal processor (ISP) 11. The receiving circuit 10 transmits an image of the input frame received from the camera 2 (hereinafter, referred to as a "captured image") and an image that has been subjected to image processing by the ISP 11 (hereinafter, referred to as a "processed image") to the RAM 50.

In the present specification, when a color camera is used as the camera 2, a "captured image" means an image obtained by sampling light received by the camera 2 using a photodiode of an imaging element (image sensor) through a color filter array of a Bayer array. A "processed image" means an image obtained by converting information of each pixel of the captured image (the unprocessed, original image) into a full-color image defined by R (red), G (green), and B (blue) values for the pixels. The image sensor is not limited to a color sensor of the Bayer array and may be another type of color sensor.

In the present specification, when a monochrome camera or a NIR camera is used as the camera 2, the "captured image" means an image defined by a signal value correlated with an amount of light received by the camera 2 using a photodiode of the imaging element. The signal value correlated with the light received by the photodiode in the captured image is more simply referred to as "signal value of a captured image". A "processed image" in this context means an image obtained by adjusting image quality, such as by noise removal on the captured image. In some examples, a captured image may be used as it is (that is, with no additional processing) as the processed image.

In the following description, when the captured image and the processed image are being distinguished from each other by type, the images are respectively referred to as the captured image and the processed image. When these images are not being distinguished from each other, the images are both simply referred to as a frame.

The ISP 11 receives the captured image from the camera 2. When the color camera is used as the camera 2, the ISP 11 converts the received captured image into a full-color image. The ISP 11 outputs the full-color image as the processed image. When the monochrome camera or the NIR camera is used as the camera 2, the ISP 11 outputs the received captured image as the processed image without processing or the image obtained by adjusting the image quality (such as by noise removal) as the processed image.

1.1.3 Hardware Configuration of Accelerator 30

FIG. 3 is a block diagram showing an example of the hardware configuration of the accelerator 30 in the motion estimation device 1 according to the first embodiment.

The accelerator 30 includes a control unit 31, a deep neural network (DNN) calculator 35, and a communication unit 36.

The control unit 31 (controller) includes a CPU 32, a ROM 33, and a RAM 34. The control unit 31 controls the operation of the accelerator 30.

The CPU 32 performs various calculations related to the motion estimation processing. The CPU 32 may be a multiprocessor. The CPU 32 may be a DSP, a GPU, or an accelerator. Various calculations related to the motion estimation processing may be performed by the CPU 20.

The ROM 33 is a non-volatile memory. The ROM 33 stores, for example, a motion estimation processing program 330 executed by the accelerator 30. The motion estimation processing program 330 is a program causing the accelerator 30 to execute the motion estimation processing such as distance estimation, reliability region creation (regional reliability estimation or reliability estimation), feature point detection, feature point selection, feature point matching, moving point detection, key frame determination, pose estimation, key frame registration, local mapping, distance check, global map creation determination, and global map creation, which will be described below.

The RAM 34 is used as a work area of the CPU 32. The RAM 34 is a semiconductor memory such as a DRAM or an SRAM. The RAM 34 temporarily stores, for example, the motion estimation processing program 330, the input frame, map information 340 obtained by the motion estimation processing, and data at the time of executing the motion estimation processing by the CPU 32. In FIG. 3, all but the map information 340 is omitted. The motion estimation processing program 330 is loaded from the ROM 33 into the RAM 34 by the control unit 31 immediately after the motion estimation device 1 is powered on, for example.

The DNN calculator 35 creates machine learning data 350 based on various pieces of learning data. The machine learning data 350 is a data set created by using a machine learning algorithm. The machine learning data 350 is not limited to being created by the DNN calculator 35 and may be created by an external device (server or the like) and supplied to the motion estimation device 1. Learning data created by the external device may be provided through a network or offline through an external storage such as a flash memory. The DNN calculator 35 performs various analyses (inferences) and data calculations based on machine learning data 350.

The communication unit 36 is a communication interface that controls communication between the accelerator 30 and the outside including the CPU 20 and the RAM 50. The communication unit 36 receives, for example, the input frame from the outside and stores the frame in the RAM 34. The communication unit 36 outputs the result of the motion estimation obtained by executing the motion estimation processing program 330 to the outside.

1.1.4 Functional Configuration of Accelerator 30

Figure 4:
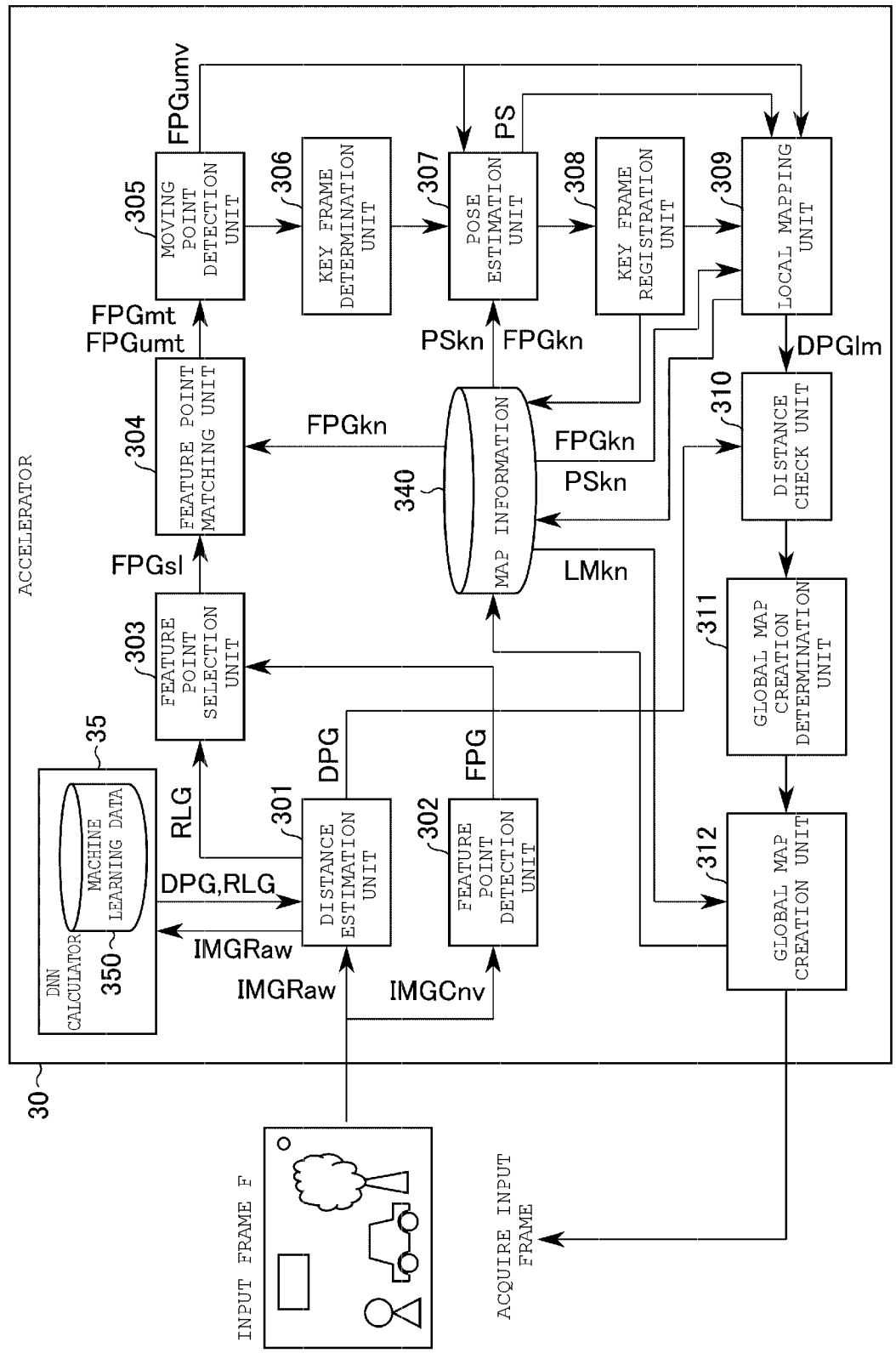
FIG. 4 is a block diagram depicting certain functional aspects of an accelerator in a motion estimation device according to a first embodiment.

FIG. 4 is a block diagram showing an example of the functional configuration of the accelerator 30 in the motion estimation device 1 according to the present embodiment. In the following, a case where a color camera is used as the camera 2 will be described as an example. It is noted that the monochrome camera or the NIR camera may be used as the camera 2.

The control unit 31 loads the motion estimation processing program 330 stored in the ROM 33 into the RAM 34. The control unit 31 analyzes and executes the motion estimation processing program 330 loaded into the RAM 34 by the CPU 32 to control an element of each function of the accelerator 30.

When the motion estimation processing is executed based on an input frame F, the accelerator 30 functions as a distance estimation unit 301, a feature point detection unit 302, a feature point selection unit 303, a feature point matching unit 304, a moving point detection unit 305, a key frame determination unit 306, a pose estimation unit 307, a key frame registration unit 308, a local mapping unit 309, a distance check unit 310, a global map creation determination unit 311, and a global map creation unit 312.

In the following, each function of the accelerator 30 will be described by taking as an example a case where the camera 2 moves leftward from a position at which the past key frame was captured during the time between when the past key frame was captured and the time at which the input frame F is captured. In the present specification, the term "key frame" means a frame used for feature point matching from among frames input from the camera 2. The term "past key frame" means a key frame that was registered in the map information 340 before the capturing of the input frame F. In the present embodiment, the time interval from the capturing of the past key frame to the capturing of the input frame F is set to be in a range of several hundred milliseconds (ms) to several seconds. The image in the input frame F may include, variously, a display object (for example, a sign or a signboard), a person, a vehicle, a tree, or the sun.

Distance Estimation Unit 301

The distance estimation unit 301 receives a captured image IMGRaw (raw image) of the input frame F from the receiving circuit 10. The distance estimation unit 301 stores the received captured image IMGRaw in the RAM 34. The distance estimation unit 301 transmits the captured image IMGRaw to the DNN calculator 35. The DNN calculator 35 receives the captured image IMGRaw from the distance estimation unit 301. The DNN calculator 35 analyzes a correspondence relationship with the machine learning data 350 for each pixel of the received captured image IMGRaw to calculate a distance. In the present example, the distance that is calculated is distance (physical distance) from the camera 2 to something (a subject) depicted in the input frame F (alternatively, the distance can be considered to be the distance from the subject to the camera 2).

In the present example, the distance is represented by a point on two-dimensional coordinates of the input frame F and the distance from the camera 2. The distance may be represented by a point (x,y,z) on three-dimensional coordinates or a point (r,θ,φ) on polar coordinates with respect to the camera 2.

When a learning data set for correlating a blur shape (an amount and shape of lens blur) in the captured image to distance from the camera 2 providing the captured image is used as the machine learning data 350, the DNN calculator 35 analyzes a correspondence relationship (for example, exact match or partial match) between the blur shape (e.g., blurring due to lens shape and distance) for each pixel of the captured image IMGRaw and a blur shape (blurring) of the machine learning data 350 to calculate (estimate) the distance. In the present specification, "blur" refers to the blurring of information in an image due to lens aberration(s) that differs in effect depending on the distance to the subject and a position within the image (aberration map). In the following, a collection of calculated distances is referred to as "distance group DPG".

The DNN calculator 35 transmits a calculated distance group DPG for the input frame F to the distance estimation unit 301. The distance estimation unit 301 receives the distance group DPG from the DNN calculator 35. The distance estimation unit 301 sets the distance of the received distance group DPG as an estimated distance for each pixel of the captured image IMGRaw. Accordingly, the distance is estimated for each pixel of the captured image IMGRaw. The distance estimation unit 301 stores the received distance group DPG in the RAM 34. The distance estimation unit 301 transmits the distance group DPG of the input frame F to the distance check unit 310.

The DNN calculator 35 analyzes the correspondence relationship with the machine learning data 350 for each pixel of the captured image IMGRaw to calculate a reliability (likelihood) for the distance. In the present specification, the "reliability (likelihood)" means confidence in the calculated distance. In the present embodiment, the reliability value is represented by a point on the two-dimensional coordinates of the input frame F and a probability (%) indicating the confidence level (certainty level).

When the learning data set used for learning the blur shape for each distance of the captured image is used as the machine learning data 350, the DNN calculator 35 analyzes closeness (match) between the blur shape for each pixel in the captured image IMGRaw and the blur shape of the machine learning data 350 to calculate the reliability for the distance. When a corresponding blur shape of the captured image IMGRaw is analyzed and found to be close to a corresponding blur shape of the machine learning data 350, the DNN calculator 35 calculates high reliability. On the other hand, when the corresponding blur shape of the captured image IMGRaw is analyzed and found not to be close to the corresponding blur shape of the machine learning data 350, the DNN calculator 35 calculates low reliability. A numerical value (%) increases as the reliability becomes higher, and the numerical value (%) decreases as the reliability becomes lower. In the following, a collection of one or more calculated pieces of reliability values is referred to as "reliability group RLG".

The DNN calculator 35 transmits the calculated reliability group RLG of the input frame F to the distance estimation unit 301. The distance estimation unit 301 receives the reliability group RLG from the DNN calculator 35. The distance estimation unit 301 sets the reliability of the received reliability group RLG for each pixel of the captured image IMGRaw. Accordingly, the reliability is generated (created) for each pixel of the captured image IMGRaw. The distance estimation unit 301 stores the received reliability group RLG in the RAM 34. The distance estimation unit 301 transmits the reliability group RLG of the input frame F to the feature point selection unit 303.

Figure 5:
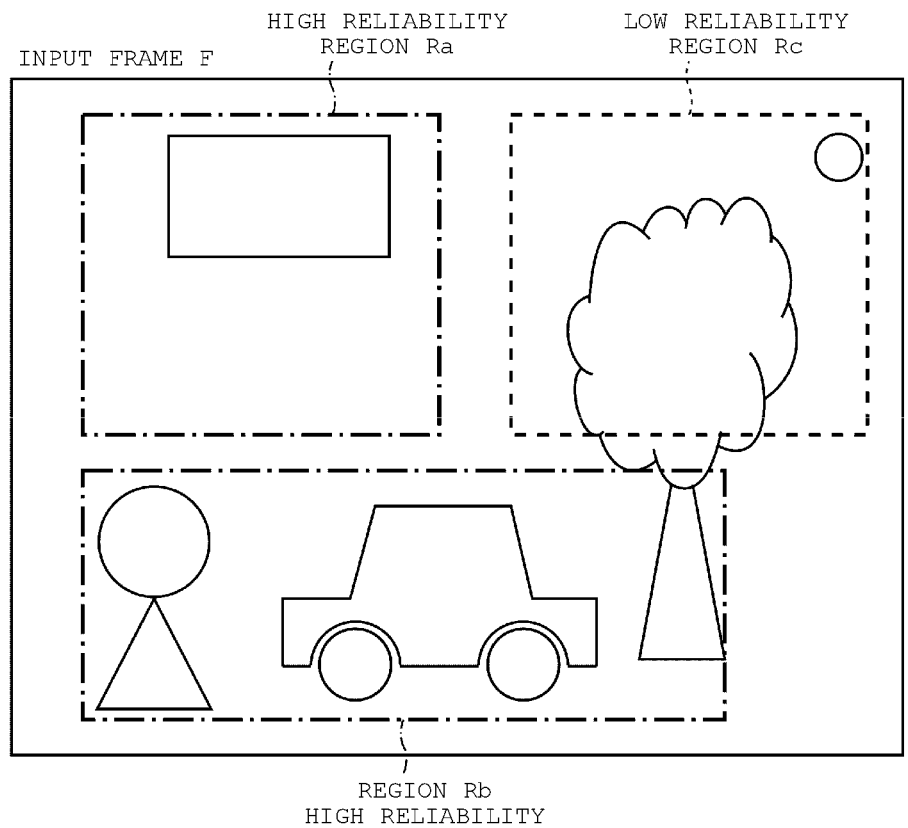
FIG. 5 schematically depicts an example of reliability regions created by a motion estimation device according to a first embodiment.

FIG. 5 is a simple diagram showing an example of the reliability regions created by the motion estimation device 1 according to the present embodiment. FIG. 5 shows an example in which each piece of reliability of the reliability group RLG of the input frame F is classified based on a reference value (hereinafter, referred to as "reference value RV1"). As a result of the classification, each piece of reliability of the reliability group RLG of the input frame F is represented by, for example, regions Ra to Rc. The region Ra includes, for example, a display object. The region Rb includes, for example, a person, a vehicle, and a tree trunk. The region Rc includes, for example, leaves and the sun. The regions Ra and Rb of the input frame F indicate regions having high reliability. That is, each pixel in the regions Ra and Rb has high reliability. The region Rc of the input frame F indicates a region having low reliability. That is, each pixel in the region Rc has low reliability. The reliability values need not be divided into regions having a high reliability and regions having a low reliability as shown in FIG. 5. For example, the reliability may be high at an edge portion of the subject and low outside the edge portion. The reliability may be low at the edge portion of the subject and high outside the edge portion.

Feature Point Detection Unit 302

The feature point detection unit 302 receives a processed image IMGCnv of the input frame F from the receiving circuit 10 (see FIG. 2). The feature point detection unit 302 detects a feature point based on the received processed image IMGCnv. In the present specification, the term "feature point" means a point where a position of an object or the like such as a corner of a building or a sign can be easily specified (identified) in the input frame F. In the present example, each feature point is represented as a point on the two-dimensional coordinates of the frame F. For example, an oriented FAST and rotated BRIEF (ORB) feature data or the like may be used for generating the feature point(s). The ORB is a combination of FAST feature point detection and a BRIEF feature data descriptor. The feature point detection unit 302 detects a feature point based on pixel values of each pixel of the processed image IMGCnv, using an algorithm such as corner detection (Harris-corner), feature point detection (scale invariant feature transform (SIFT)), or speeded up robust features (SURF). In the following, a collection of one or more detected feature points is referred to as a "feature point group FPG". The feature point detection unit 302 transmits the feature point group FPG of the input frame F to the feature point selection unit 303.

Figure 6:
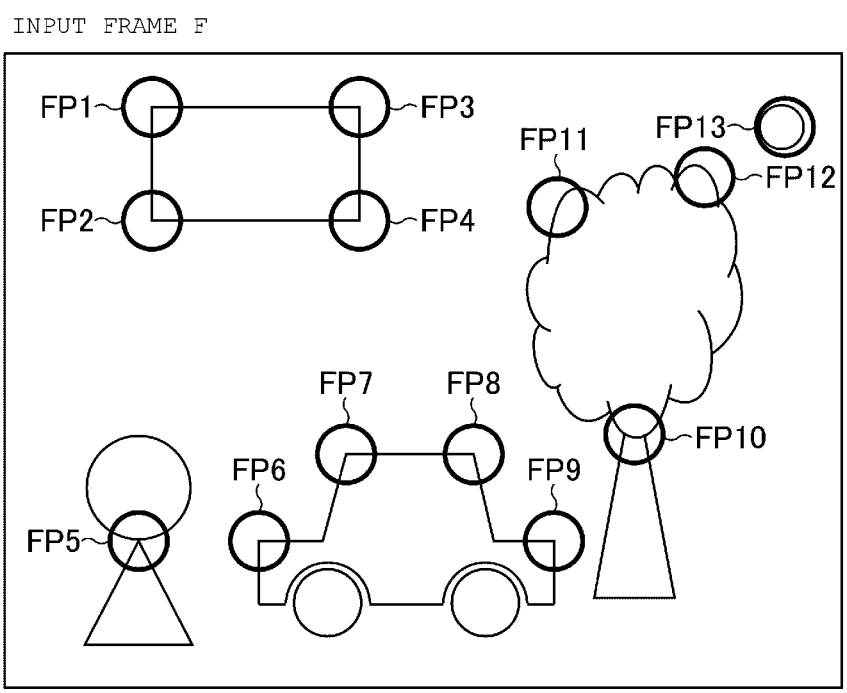
FIG. 6 schematically depicts an example of feature points detected by a motion estimation device according to a first embodiment.

FIG. 6 is a simple diagram showing an example of feature points detected by the motion estimation device 1 according to the present embodiment. FIG. 6 shows an example in which the feature point group FPG of the input frame F includes feature points FP1 to FP13. The feature points FP1 to FP4 are feature points detected for the display object. The feature points FP1 to FP4 correspond to, for example, each corner of the display object. The feature point FP5 is a feature point detected for the person. The feature point FP5 corresponds to, for example, the neck of the person. The feature points FP6 to FP9 are feature points detected for the vehicle. The feature points FP6 to FP9 correspond to, for example, corners of the vehicle. The feature points FP10 to FP12 are feature points detected for the tree. The feature point FP10 corresponds to, for example, a base of a tree branch. The feature points FP11 and FP12 correspond to, for example, end portions of the leaves. The feature point FP13 is a feature point detected for the sun. The feature point group FPG of the input frame F may differ from the example of FIG. 6 depending on the feature point detection algorithm.

The feature point detection unit 302 may receive the distance group DPG from the distance estimation unit 301. In this case, the feature point detection unit 302 can detect each feature point based on the received distance group DPG or the processed image IMGCnv, and detect the feature point group FPG based on results of these detections.

Feature Point Selection Unit 303

The feature point selection unit 303 selects a feature point having high reliability from among the feature points of the feature point group FPG received from the feature point detection unit 302 based on the reliability group RLG received from the distance estimation unit 301. For example, the feature point selection unit 303 selects a feature point having a reliability of the reference value RV1 or more and does not select any feature point having a reliability of less than the reference value RV1. In the following, a collection of one or more selected feature points is referred to as "feature point group FPGsl" (a selected feature point group).

Figure 7:
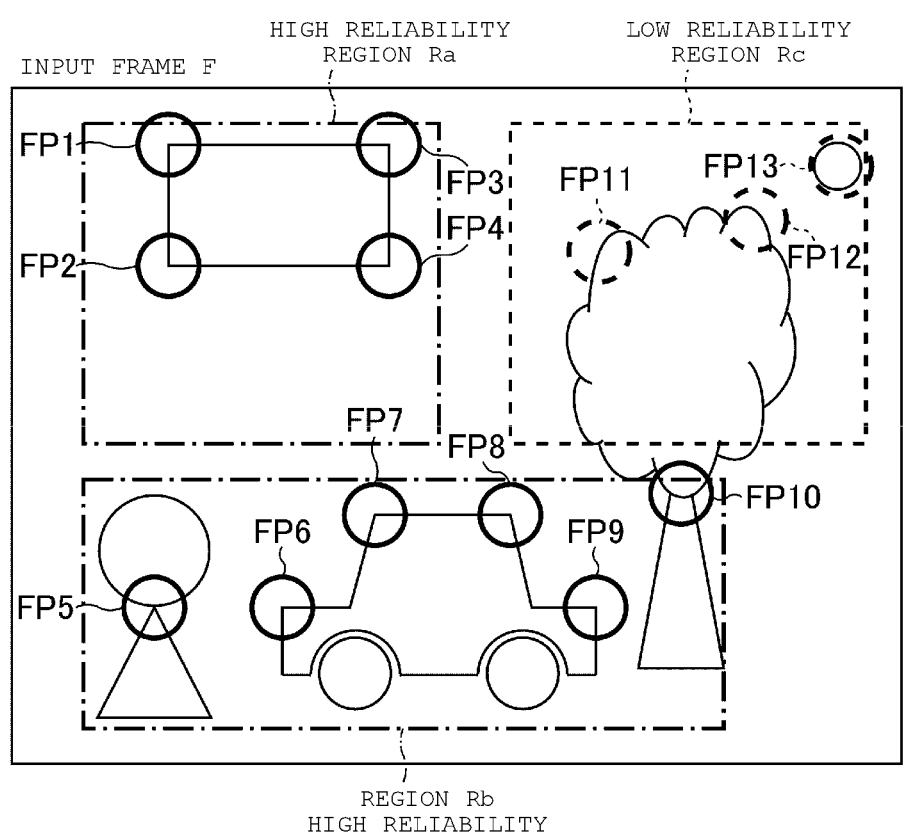
FIG. 7 schematically depicts an example of feature point selection in a motion estimation device according to a first embodiment.

FIG. 7 is a simple diagram showing an example of the feature point selection in the motion estimation device 1 according to the present embodiment. The regions Ra and Rb having high reliability have a reliability of the reference value RV1 or more. The region Rc has low reliability (reliability less than the reference value RV1). The feature point selection unit 303 selects the feature points FP1 to FP10 in the regions Ra and Rb from among the feature points FP1 to FP13 (feature point group FPG) as the feature point group FPGsl. On the other hand, the feature point selection unit 303 does not select the feature points FP11 to FP13 in the region Rc having low reliability. The feature point selection unit 303 transmits the feature point group FPGsl to the feature point matching unit 304.

Feature Point Matching Unit 304

The feature point matching unit 304 acquires a feature point group FPGkn of a past key frame Fkn (key frame n frames (where n is a natural number of one or more) before the input frame F) from the map information 340. The feature point matching unit 304 compares the feature point group FPGsl of the input frame F received from the feature point selection unit 303 with the feature point group FPGkn. As a result of the comparison, the feature point matching unit 304 determines that a feature point of the feature point group FPGsl corresponding to any one of feature points of the feature point group FPGkn is a corresponding (matching) feature point. The feature point matching unit 304 determines that a feature point that does not correspond to any one of the feature points of the feature point group FPGkn is a non-corresponding (non-matching) feature point. In the following, a collection of one or more feature points determined to be corresponding feature points for feature points in the feature point group FPGKn is referred to as "corresponding feature point group FPGmt". The collection of one or more feature points determined to be non-corresponding feature points is referred to as "non-corresponding feature point group FPGumt".

Figure 8:
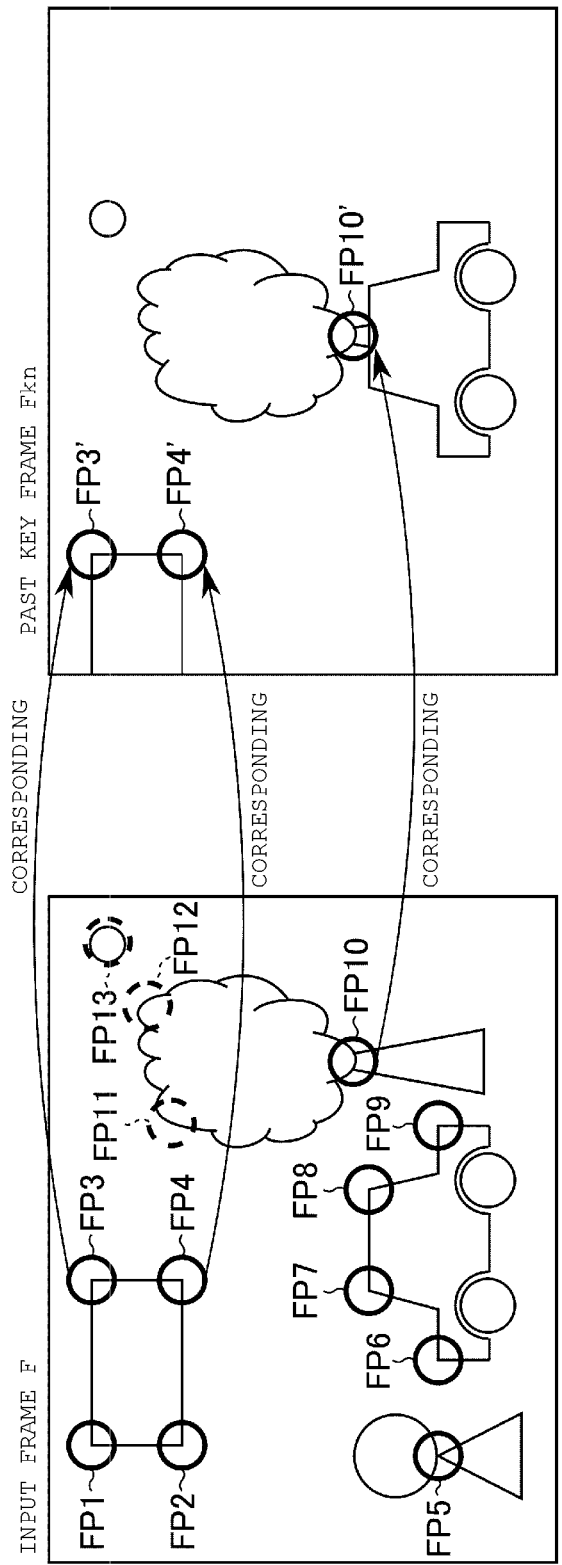
FIG. 8 schematically depicts an example of feature point matching in a motion estimation device according to a first embodiment.

FIG. 8 is a simple diagram showing an example of the feature point matching in the motion estimation device 1 according to the present embodiment. The feature point group FPGkn of the past key frame Fkn includes feature points FP3' and FP4' for the display object and a feature point FP10' for the tree.

The feature point matching unit 304 compares the feature point group FPGsl (feature points FP1 to FP10) to the feature point group FPGkn (feature points FP3', FP4', and FP10'). As a result of the comparison, the feature point matching unit 304 determines that the feature point FP3 matches the feature point FP3', the feature point FP4 matches the feature point FP4', and the feature point FP10 matches the feature point FP10'. That is, the feature point matching unit 304 determines that the feature points FP3, FP4, and FP10 among the feature points FP1 to FP10 are the corresponding feature points to feature points identified in the past key frame Fkn. The feature point matching unit 304 also determines that the feature points FP1, FP2, and FP5 to FP9 of the feature point group FPGsl are non-corresponding feature points. The feature point matching unit 304 transmits the corresponding feature point group FPGmt and the non-corresponding feature point group FPGumt for the input frame F to the moving point detection unit 305.

Moving Point Detection Unit 305

The moving point detection unit 305 detects moving points based on the non-corresponding feature point group FPGumt received from the feature point matching unit 304. In the present specification, a "moving point" refers to a feature point that can be considered to have moved between frames regardless of the movement of the camera 2 itself.

The moving point detection unit 305 detects a non-moving point based on the corresponding feature point group FPGmt and the non-corresponding feature point group FPGumt of the input frame F received from the feature point matching unit 304. In the present specification, a "non-moving point" refers to a feature point that is not a moving point and is also a feature point corresponding to one of feature points in a past key frame Fkn.

Figure 9:
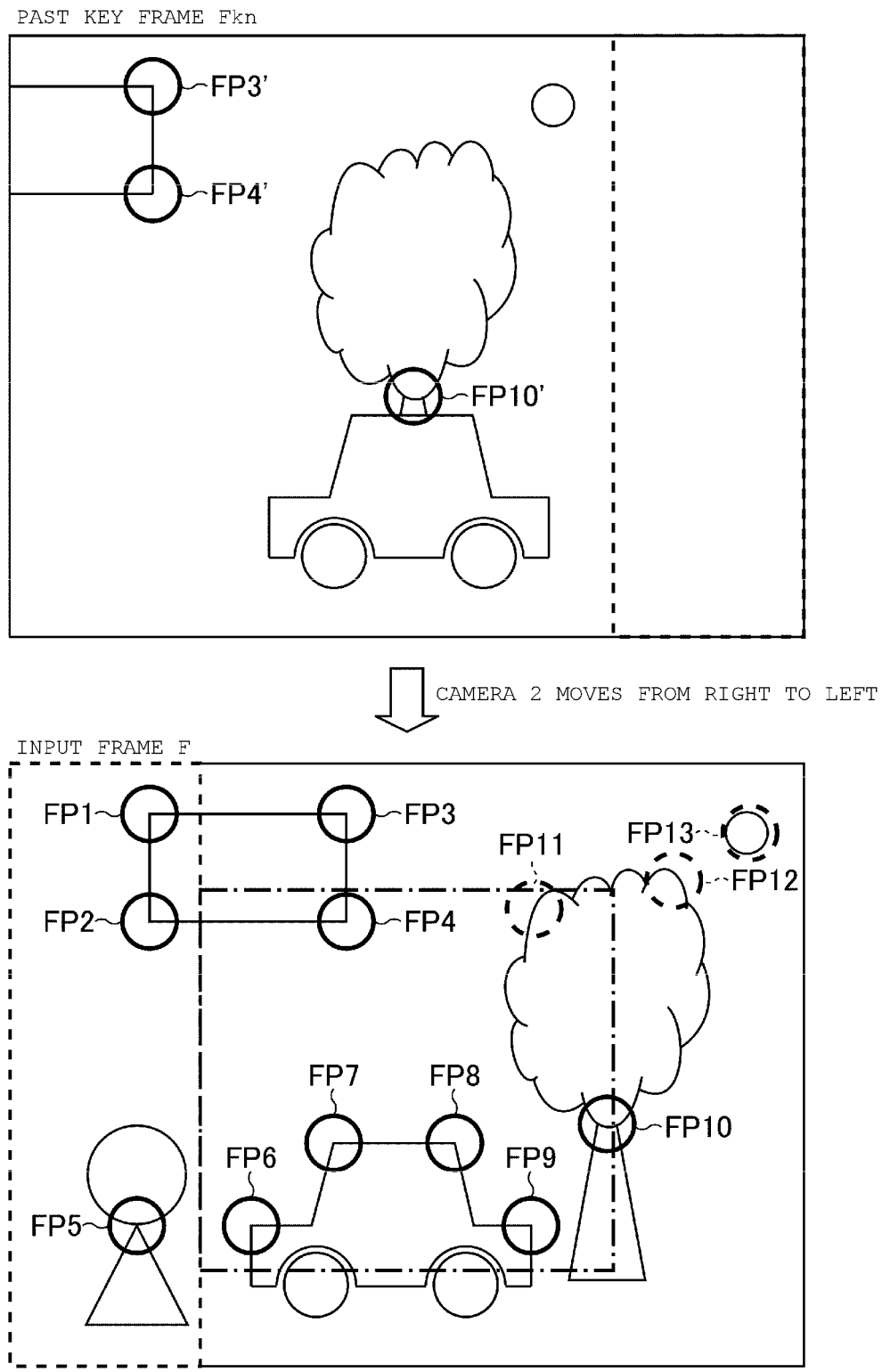
FIG. 9 schematically depicts an example of moving point detection in a motion estimation device according to a first embodiment.

FIG. 9 is a simple diagram showing an example of the moving point detection in the motion estimation device 1 according to the present embodiment. The vehicle (and thus camera 2) moves to the left from when the past key frame Fkn was captured.

The feature points at a left end (portion surrounded by broken line) of the input frame F are points that are outside the frame (field of view) of the past key frame Fkn. A right end (portion surrounded by broken line) of the past key frame Fkn is correspondingly outside the frame (field of view) of the input frame F.

If the time interval from the capturing of the past key frame Fkn until the capturing of the input frame F is short (several hundred ms to several seconds), the moving distance of the camera 2 from the past key frame Fkn to the input frame F will be short. Therefore, the feature points in the vicinity of the center of the input frame F (portion surrounded by alternate long and short dash line) are considered to be also present in the past key frame Fkn. The vicinity of the center of the input frame F is, for example, a region other than edge portions (upper end, lower end, left end, and right end) of the input frame F. Therefore, the moving point detection unit 305 determines that the feature points FP6 to FP9 in the vicinity of the center of the input frame F among the feature points FP1, FP2, and FP5 to FP9 of the non-corresponding feature point group FPGumt are the moving points. Accordingly, the moving points among the feature points of the input frame F are detected.

The moving point detection unit 305 determines that the feature points FP1, FP2, and FP5 (feature points that are outside the frame in past key frame Fkn) located at the left end of the input frame F among the feature points of the non-corresponding feature point group FPGumt are non-moving points. The moving point detection unit 305 also determines that the feature points FP3, FP4, and FP10 of the corresponding feature point group FPGmt are also non-moving points. Accordingly, the non-moving points among the feature points of the input frame F are detected.

In the following, a collection of one or more feature points detected as the moving points is referred to as "moving feature point group FPGmv". A collection of one or more feature points detected as the non-moving points is referred to as "non-moving feature point group FPGumv". The moving point detection unit 305 transmits the non-moving feature point group FPGumv of the input frame F to the pose estimation unit 307 and the local mapping unit 309.

Instead of detecting the moving feature point group FPGmv, a feature point determined to be a moving point among the feature points of the non-corresponding feature point group FPGumt may be labeled as a moving point.

The end portion of the input frame F determined to be the non-moving point can be changed according to a direction in which the camera 2 moves from the capturing of the past key frame Fkn. For example, when the camera 2 moves upward from the position at the time of capturing the past key frame Fkn, the feature point at the upper end of the input frame F can be determined as the non-moving point. The same applies to cases where the camera 2 moves to the right and moves downward from the position at the time of capturing the past key frame Fkn.

When the camera 2 moves forward from the position at the time of capturing the past key frame Fkn, the upper end, the lower end, the left end, and the right end of the past key frame Fkn are out of the frame in the input frame F. On the other hand, when the camera 2 moves backward from the position at the time of capturing the past key frame Fkn, the upper end, lower end, left end, and right end of the input frame F are points outside the frame in the past key frame Fkn. Also in these cases, among the feature points of the non-corresponding feature point group FPGumt, the feature points in the vicinity of the center of the input frame F can be determined to be the moving points, and the feature points at the upper end, lower end, left end, and right end of the input frame F can be determined as the non-moving points.

The end portion of the input frame F can be set as a fixed number of pixels. The number of pixels at the end portion of the input frame F may be set based on a direction of movement of the vehicle. When the camera 2 moves to the left from the of capturing the past key frame Fkn, the number of pixels at the left end of the input frame F may be set large. The number of pixels at the end portion of the input frame F may be set based on the moving distance (number of pixels) of the camera 2 from the past key frame Fkn to the input frame F.

Key Frame Determination Unit 306

The key frame determination unit 306 determines whether or not the input frame F is to be used as a key frame (in subsequent processing). For example, the key frame determination unit 306 can determine that an input frame F is used as a key frame for each $m^{th}$ frame (where m is a natural number of one or more).

The key frame determination unit 306 may receive the corresponding feature point group FPGmt of the input frame F from the feature point matching unit 304. In this case, the key frame determination unit 306 can determine that the input frame F is to be used as a key frame when the number of feature points in the corresponding feature point group FPGmt is one or more and the input frame F is not to be used as a key frame when the number of feature points in the corresponding feature point group FPGmt is zero, for example.

Pose Estimation Unit 307

The pose estimation unit 307 acquires a pose PSkn of the past key frame Fkn and the feature point group FPGkn from the map information 340. In the present specification, "pose" means a position of the camera 2 with respect to the subject in a frame. In the present embodiment, each "pose" is represented by the point on three-dimensional coordinates. The pose estimation unit 307 estimates a pose PS from the input frame F based on the non-moving feature point group FPGumv received from the moving point detection unit 305, the pose PSkn, and the feature point group FPGkn. For example, the pose estimation unit 307 calculates the moving distance (the number of pixels moved) from the past key frame Fkn for each feature point of the non-moving feature point group FPGumv. The pose estimation unit 307 estimates the pose PS of the input frame F based on the calculated moving distance and the pose PSkn. The pose estimation unit 307 transmits the pose PS of the input frame F to the local mapping unit 309.

Key Frame Registration Unit 308

The key frame registration unit 308 registers an input frame F as a key frame. For example, the key frame registration unit 308 registers an input frame F, the non-moving feature point group FPGumv of the input frame F, the pose PS for the input frame F, the moving feature point group FPGmv of the input frame F (non-corresponding feature point group FPGumt when a label is attached to the moving point inside the non-corresponding feature point group FPGumt), and a relationship with another key frame in the map information 340. The input frame F is registered as a frame Fkn. The non-moving feature point group FPGumv is registered as a feature point group FPGkn. The pose PS is registered as a pose PSkn. The moving feature point group FPGmv is registered as a moving point group FPGmvkn. The relationship between the input frame F and another (previous) key frame is also registered.

Local Mapping Unit 309

The local mapping unit 309 acquires the pose PSkn of the past key frame Fkn and the feature point group FPGkn from the map information 340. The local mapping unit 309 calculates a distance to each feature point of the non-moving feature point group FPGumv by triangulation based on the pose PS received from the pose estimation unit 307, the non-moving feature point group FPGumv received from the moving point detection unit 305, the pose PSkn, and the feature point group FPGkn. In the following, a collection of one or more calculated distances is referred to as a "distance group DPGlm" or a "local map LM". The local mapping unit 309 registers the calculated distance group DPGlm in the map information 340. The distance group DPGlm is registered as a local map LMkn for the feature point(s). The local mapping unit 309 transmits the distance group DPGlm to the distance check unit 310.

Distance Check Unit 310

The distance check unit 310 compares the distance group DPGlm received from the local mapping unit 309 with the distance group DPG received from the distance estimation unit 301. As a result of the comparison, when the distances for corresponding feature points are different, the distance check unit 310 determines that one or the other of the distance group DPGlm or the distance group DPG is not valid. In this case, the distance check unit 310 may determine validity based on the result of the distance check in the next input frame. The distance check unit 310 may delete the distance group DPGlm registered as the local map LMkn from the map information 340. The distance check unit 310 may rely on the distance group DPG and register the distance group DPG as the local map LMkn in the map information 340. On the other hand, when the distances at the corresponding feature points are the same, the distance check unit 310 ends the distance check.

Global Map Creation Determination Unit 311

The global map creation determination unit 311 determines whether or not to create a global map GM. In the present specification, a "global map" refers to a representation of the feature point (s) represented by the local map LM within the entire search space. The global map is represented by, for example, a point on three-dimensional coordinates. For example, the global map creation determination unit 311 can determine that the global map GM is created once every second. In some examples, the global map creation determination unit 311 may determine that the global map GM is created for each $m^{th}$ frame (where m is a natural number of one or more). The global map creation determination unit 311 may determine that the global map GM is to be created when the local map LM is a certain size or when there is an available margin in a calculation resource.

Global Map Creation Unit 312

The global map creation unit 312 acquires the local map LMkn of the most recent two or more key frames Fkn including the input frame F from the map information 340. The global map creation unit 312 aligns corresponding feature points of the local map LMkn and creates the global map GM so as to reduce an error in the positions of the corresponding feature points. The global map GM is created by an algorithm such as loop closing. The global map creation unit 312 registers the created global map GM in the map information 340. The global map GM is registered in the map information 340 as a global map GMkn.

Map Information 340

Figure 10:
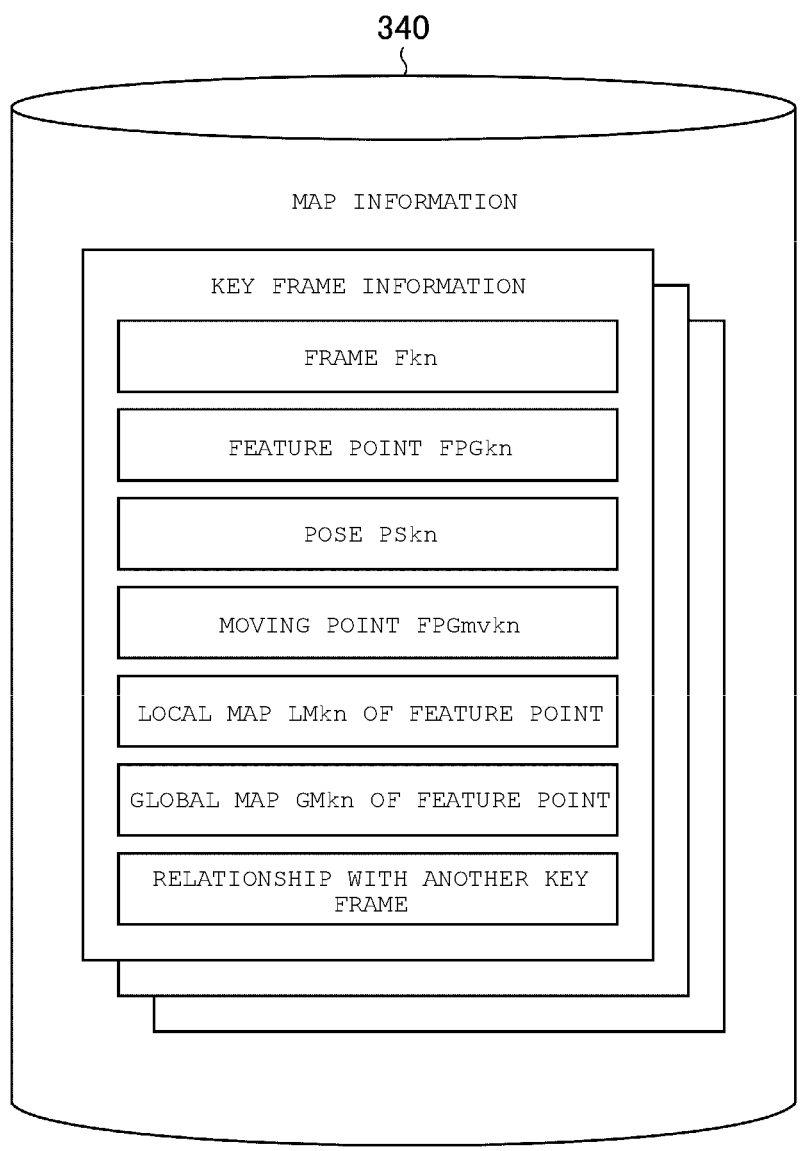
FIG. 10 is a diagram showing an example of map information stored in a motion estimation device according to a first embodiment.

FIG. 10 is a diagram showing an example of the map information 340 stored in the motion estimation device 1 according to the present embodiment. The map information 340 stores information of the input frame F selected to be the key frame by the key frame determination unit 306 as key frame information. The key frame information includes the frame Fkn, the feature point group FPGkn, the pose PSkn, the moving point FPGmvkn, the local map LMkn, the global map GMkn, a relationship with another key frame, and the like.

1.2 Motion Estimation Operation

Figure 11:
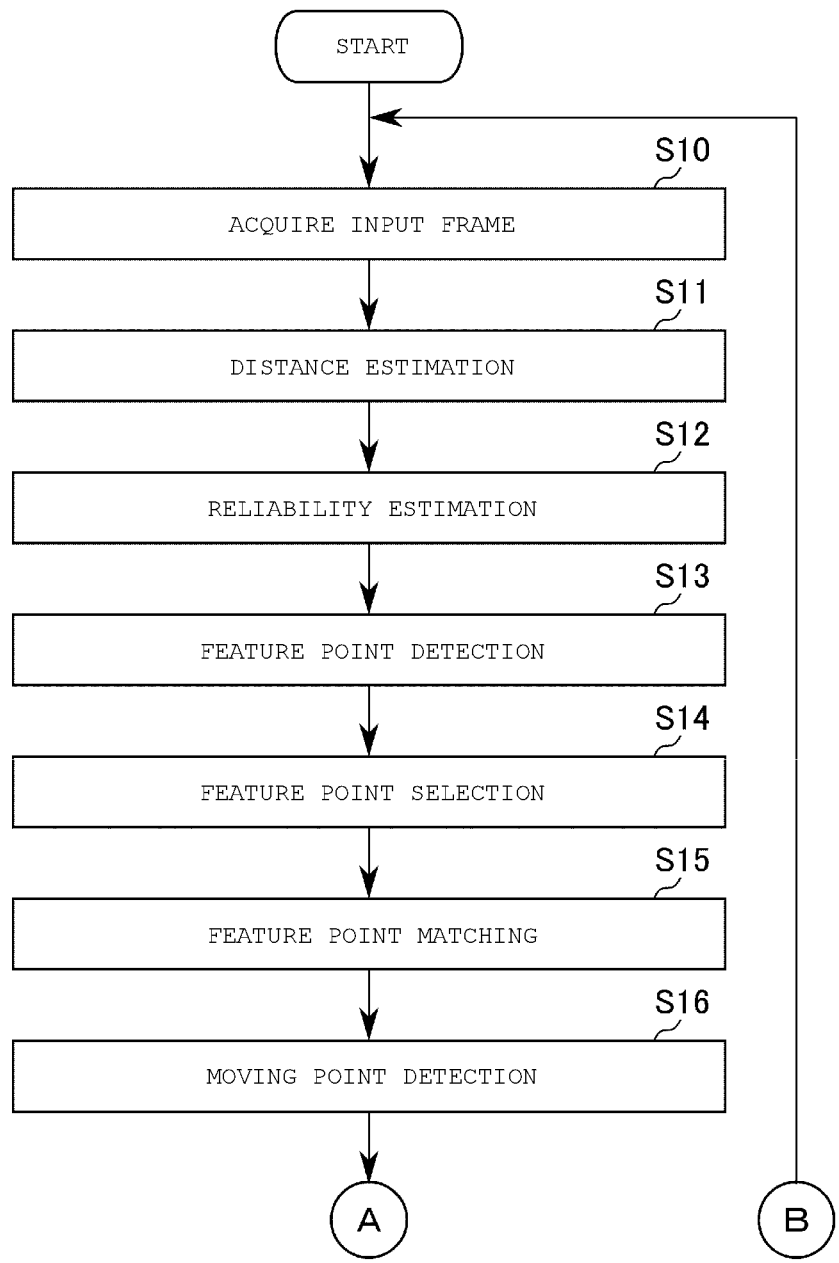
FIG. 11 is a flowchart showing a motion estimation operation of a motion estimation device according to a first embodiment.
Figure 12:
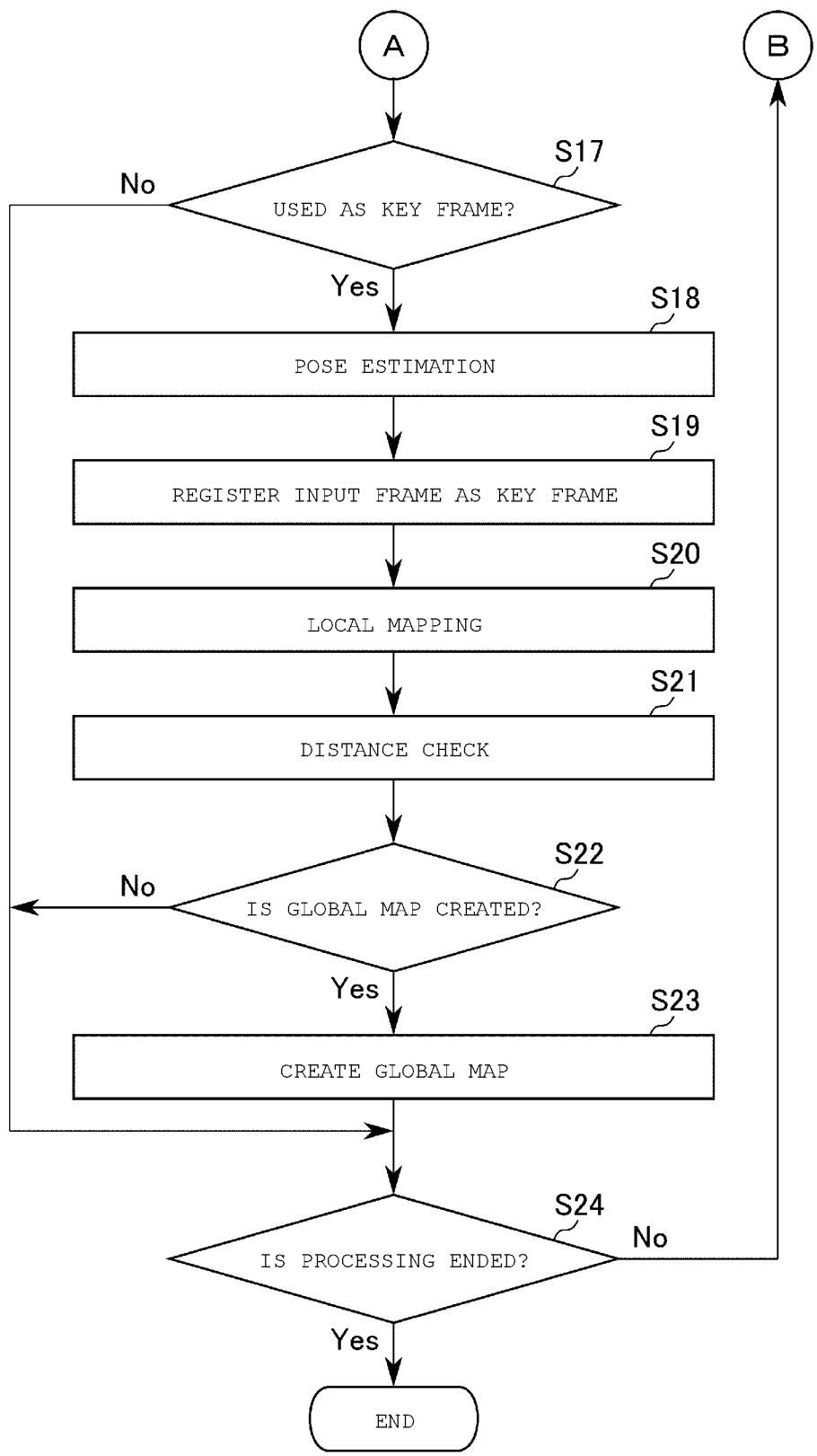
FIG. 12 is a flowchart showing additional aspects of a motion estimation operation of a motion estimation device according to a first embodiment.

A motion estimation operation of the motion estimation device 1 according to the present embodiment will be described with reference to FIGS. 11 and 12. FIGS. 11 and 12 are flowcharts showing the motion estimation operation of the motion estimation device 1 according to the present embodiment.

The motion estimation device 1 acquires the input frame F from the camera 2 in S10.

After the motion estimation device 1 acquires the input frame F, the control unit 31 functions as the distance estimation unit 301 to perform the distance estimation as described above in S11 and the reliability region creation as described above in S12. Accordingly, the distance group DPG is estimated for the input frame F, and the reliability group RLG is created.

After the distance estimation and the reliability region creation (reliability estimation) are executed, the control unit 31 functions as the feature point detection unit 302 to perform the feature point detection (S13) as described above. Accordingly, the feature point group FPG for the input frame F is detected.

After the feature point detection is executed, the control unit 31 functions as the feature point selection unit 303 to perform the feature point selection (S14) as described above. Accordingly, the feature point group FPGsl for the input frame F is selected.

After the feature point selection is executed, the control unit 31 functions as the feature point matching unit 304 to perform the feature point matching (S15) as described above. Accordingly, the corresponding feature point group FPGmt and the non-corresponding feature point group FPGumt for the input frame F are obtained.

After the feature point matching is executed, the control unit 31 functions as the moving point detection unit 305 to perform the moving point detection (S16) as described above. Accordingly, the moving feature point group FPGmv and the non-moving feature point group FPGumv for the input frame F are detected.

After the moving point detection is executed, the control unit 31 functions as the key frame determination unit 306 to perform the key frame determination (S17) as described above.

When determination is made that the input frame F is to be used as the key frame (S17; Yes), the control unit 31 functions as the pose estimation unit 307 to perform the pose estimation (S18) as described above. Accordingly, the pose PS for the input frame F is estimated. The pose PS of the input frame F is transferred to the control device 3 by the communication unit 36.

After the pose estimation is executed, the control unit 31 functions as the key frame registration unit 308 to perform the key frame registration (S19) as described above. Accordingly, the input frame F, the non-moving feature point group FPGumv of the input frame F, the pose PS of the input frame F, the moving feature point group FPGmv of the input frame F, and the relationship with another key frame are registered in the map information 340.

After the key frame registration is executed, the control unit 31 functions as the local mapping unit 309 to perform the local mapping (S20) as described. Accordingly, the distance group DPGlm of the input frame F is created. The distance group DPGlm is registered in the map information 340 as described above.

After the local mapping is executed, the control unit 31 functions as the distance check unit 310 to perform the distance check (S21) as described above.

After the distance check is executed, the control unit 31 functions as the global map creation determination unit 311 to perform the global map creation determination (S22) as described above.

If the global map GM is created (S22; Yes), the control unit 31 functions as the global map creation unit 312 to create the global map GM (S23) as described above. Accordingly, the global map GM for the input frame F is obtained. The global map GM of the input frame F is registered in the map information 340 as described above. The global map GM of the input frame F is transferred to the control device 3 by the communication unit 36.

After the control unit 31 creates the global map GM, the motion estimation device 1 makes an end determination (processing end determination) in S24. When an end instruction is received from the user, the motion estimation device 1 determines that the processing is to be ended. For example, when an application is ended, when a system is stopped (vehicle engine is turned off and power of robot, AGV, and drone is turned off), when a robot or the like arrives at a destination, or when the vehicle is temporarily stopped (parking brake of the vehicle is engaged), the motion estimation device 1 can determine that the processing is to be ended. When the robot or the like arrives at the destination or when the vehicle is temporarily stopped, the already created global map GM may still be used. Therefore, the motion estimation device 1 may determine that the processing is not to be ended.

When determination is made that the processing is not to be ended (S24; No), the motion estimation device 1 returns to S10. On the other hand, when the determination is made that the processing is to be ended (S24; Yes), the motion estimation device 1 ends the processing.

When determination is made that the input frame F is not to be used as the key frame (S17; No), the control unit 31 proceeds directly to S24.

When determination is made that the global map GM is not created (S22; No), the control unit 31 proceeds to S24.

1.3 Effect

In the configuration according to the first embodiment, the reliability for the distance at each pixel of the input frame F is established, in addition to the distance estimation for each pixel of the input frame F and the feature point detection of the input frame F. The feature points considered to have high reliability are selected from among the detected feature points of the input frame F based on the reliability. Furthermore, in the present embodiment, the moving point(s) in the input frame F can be detected from the feature points that do not correspond to any of the feature points of the past key frame. Therefore, since the pose PS can be estimated based on the feature point(s) having high reliability and excluding the moving point(s), it is possible to improve the accuracy of the motion estimation. It is possible to create the local map LM and the global map GM that are represented by a feature point having high reliability and excluding the moving point(s).

2. Second Embodiment

The motion estimation device 1 according to a second embodiment will be described. The overall configuration of the motion estimation device 1 in the second embodiment is the same as that of FIG. 1. In the motion estimation device 1 according to the second embodiment, the distance estimation and the reliability estimation (estimated reliability region creation) aspects are different from those in the first embodiment. The hardware configuration of the accelerator 30 is the same as that of FIG. 3. The process flow of the motion estimation operation for the second embodiment is the same as that of FIGS. 11 and 12. In the following description, points different from those of the first embodiment will be primarily described.

2.1 Functional Aspects of Accelerator 30 in Second Embodiment

Figure 13:
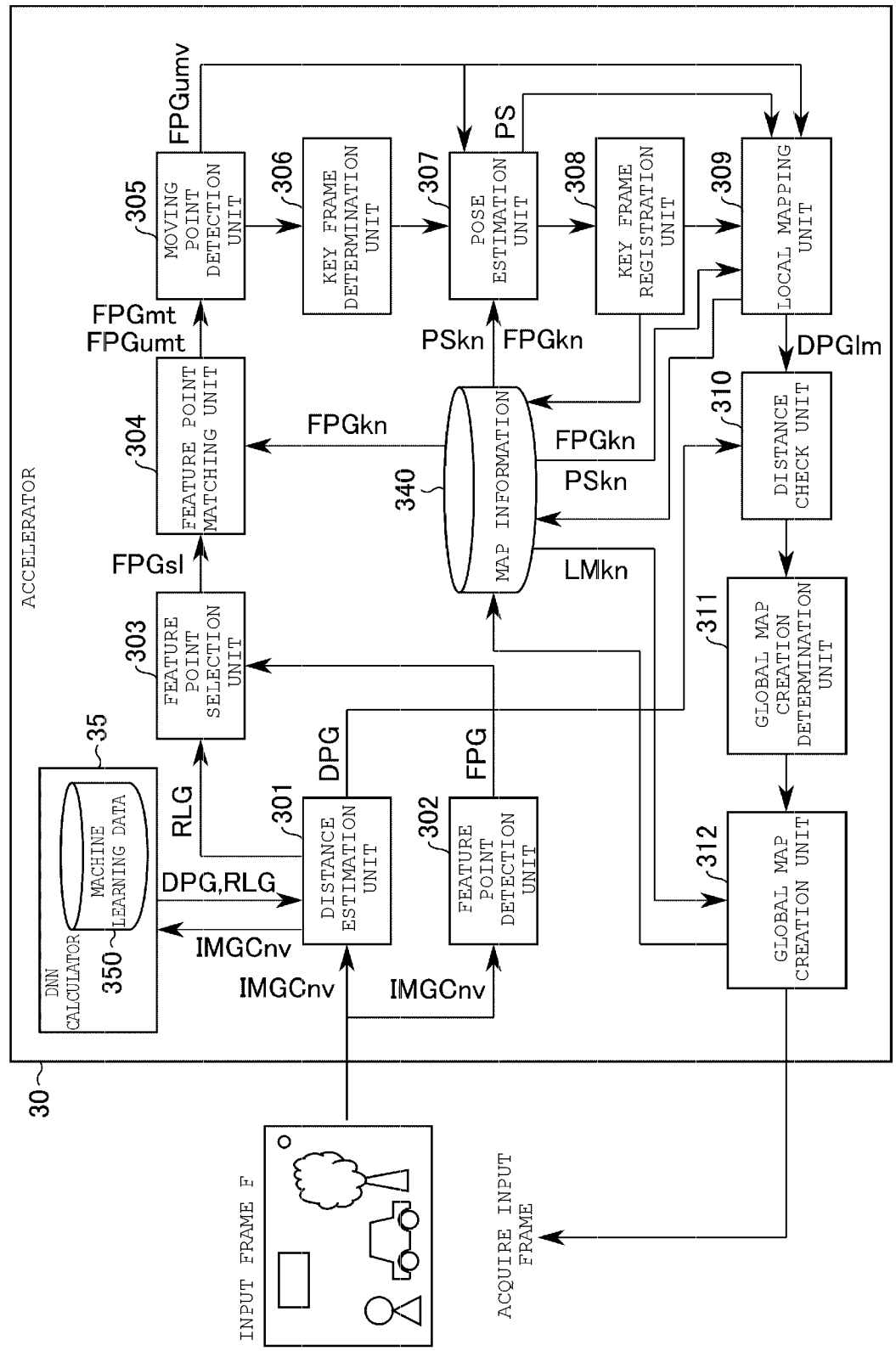
FIG. 13 is a block diagram depicting certain functional aspects of an accelerator in a motion estimation device according to a second embodiment.

FIG. 13 is a block diagram showing an example of the functional aspects of the accelerator 30 in the motion estimation device 1 according to the second embodiment. The functional aspects of the accelerator 30 shown in FIG. 13 for the second embodiment are different from that of FIG. 4 for the first embodiment in that the distance estimation unit 301 performs the distance estimation and the reliability region creation using the processed image IMGCnv of the input frame F. The other functional aspects of the accelerator 30 are the same as that of FIG. 4. In the following, a case where the color camera is used as the camera 2 will be described as an example. It is noted that a monochrome camera or a NIR camera may be used as the camera 2 in the second embodiment.

Distance Estimation Unit 301

The distance estimation unit 301 receives the processed image IMGCnv of the input frame F from the receiving circuit 10. The distance estimation unit 301 stores the received processed image IMGCnv in the RAM 34. The distance estimation unit 301 transmits the received processed image IMGCnv to the DNN calculator 35. The DNN calculator 35 receives the processed image IMGCnv from the distance estimation unit 301. The DNN calculator 35 analyzes the correspondence relationship with the machine learning data 350 for each pixel of the received processed image IMGCnv to calculate the distance.

When a learning data set used for learning a pixel value for each distance of the processed image is used as the machine learning data 350, the DNN calculator 35 analyzes a correspondence relationship (for example, all three pixel components match, or one or two pixel components match) between the pixel value for each pixel of the processed image IMGCnv and the pixel value of the machine learning data 350 to calculate the distance.

The DNN calculator 35 transmits the calculated distance group DPG of the input frame F to the distance estimation unit 301. The distance estimation unit 301 receives the distance group DPG from the DNN calculator 35. The distance estimation unit 301 sets the distance of the received distance group DPG as the estimated distance for each pixel of the processed image IMGCnv. Accordingly, the distance is estimated for each pixel of the processed image IMGCnv. The distance estimation unit 301 stores the received distance group DPG in the RAM 34. The distance estimation unit 301 transmits the distance group DPG of the input frame F to the distance check unit 310.

The DNN calculator 35 analyzes the correspondence relationship with the machine learning data 350 for each pixel of the processed image IMGCnv to calculate the reliability of the distance. When the learning data set used for learning the pixel value for each distance of the processed image is used as the machine learning data 350, the DNN calculator 35 analyzes the closeness between the pixel value and the pixel value of the machine learning data 350 for each pixel of the processed image IMGCnv to calculate the reliability of the distance. When a corresponding pixel value of the processed image IMGCnv is analyzed and found to be close to a corresponding pixel value of the machine learning data 350, the DNN calculator 35 calculates the high reliability. On the other hand, when the corresponding pixel value of the processed image IMGCnv is analyzed and found not to be close to the corresponding pixel value of the machine learning data 350, the DNN calculator 35 calculates the low reliability.

The DNN calculator 35 transmits the calculated reliability group RLG of the input frame F to the distance estimation unit 301. The distance estimation unit 301 receives the reliability group RLG from the DNN calculator 35. The distance estimation unit 301 sets the reliability of the received reliability group RLG as the created reliability for each pixel of the processed image IMGCnv. Accordingly, the reliability is created for each pixel of the processed image IMGCnv. The distance estimation unit 301 stores the received reliability group RLG in the RAM 34. The distance estimation unit 301 transmits the reliability group RLG of the input frame F to the feature point selection unit 303.

2.2 Effect

With the configuration according to the second embodiment, the same effect as that of the first embodiment is obtained.

3. Third Embodiment

The motion estimation device 1 according to a third embodiment will be described. The motion estimation device 1 according to the third embodiment further includes a receiving circuit 60. In the motion estimation device 1 according to the third embodiment, the distance estimation and the reliability region creation aspects are different from those in the first and second embodiments. The hardware configuration of the accelerator 30 is the same as that of FIG. 3. The processing flow of the motion estimation operation in the third embodiment is the same as that of FIGS. 11 and 12. In the following, points different from those of the first and second embodiments will be primarily described.

3.1 Overall Configuration of Motion Estimation Device 1 in Third Embodiment

Figure 14:
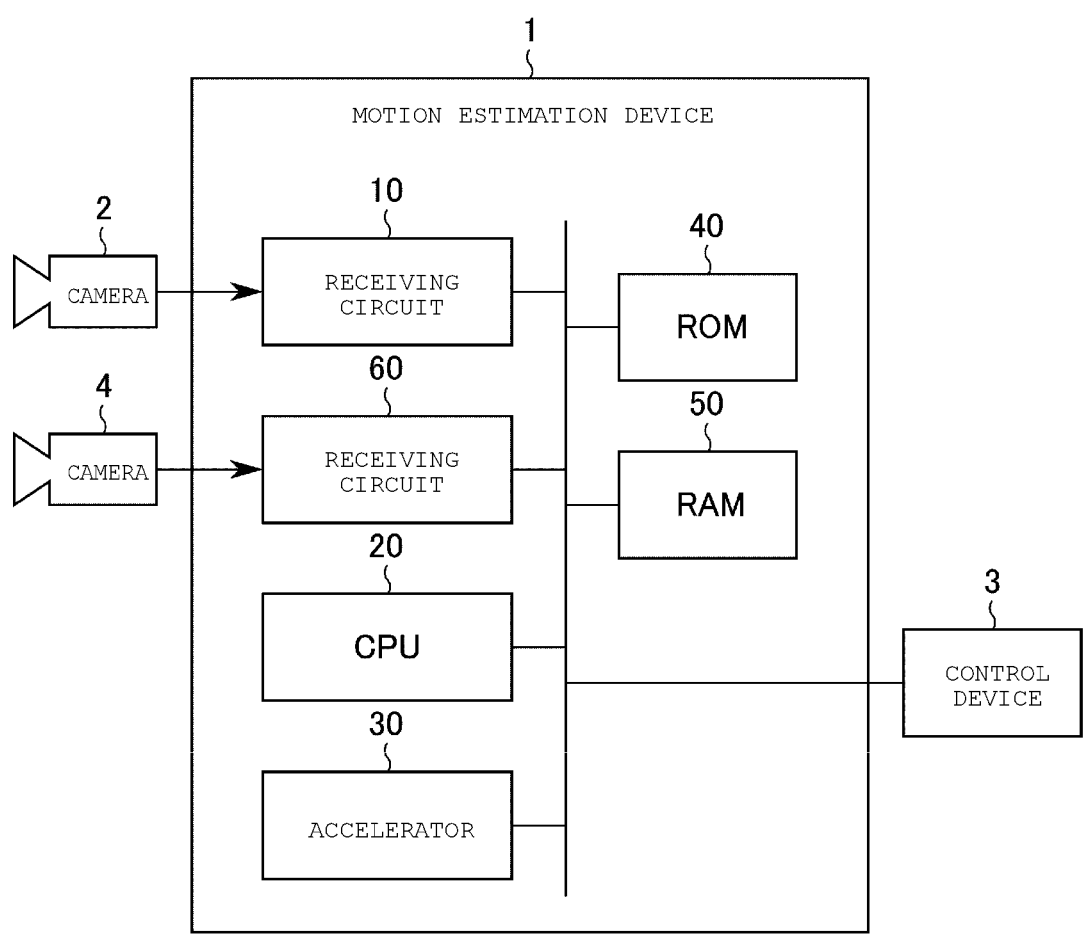
FIG. 14 is a block diagram of a motion estimation device according to a third embodiment.

FIG. 14 is a block diagram showing an example of the overall configuration of the motion estimation device 1 according to the third embodiment.

The motion estimation device 1 of the third embodiment further includes the receiving circuit 60. The motion estimation device 1 further receives, for example, a frame (image) captured by an external camera 4 mounted on the same vehicle as the motion estimation device 1 through a bus. In the third embodiment, the camera 4 is the same type monocular camera as the camera 2. In other examples, a color camera, a monochrome camera, a near-infrared (NIR) camera, or the like can be used as the camera 4. A stereo camera is configured using the cameras 2 and 4. The receiving circuit 60 receives an input frame from the camera 4. The receiving circuit 60 transmits the received input frame to the RAM 50. The receiving circuit 60 has the same configuration as the receiving circuit 10. The other configuration of the motion estimation device 1 in the third embodiment is the same as that of FIG. 1 shown for the first embodiment.

3.2 Functional Aspects of Accelerator 30 in Third Embodiment

Figure 15:
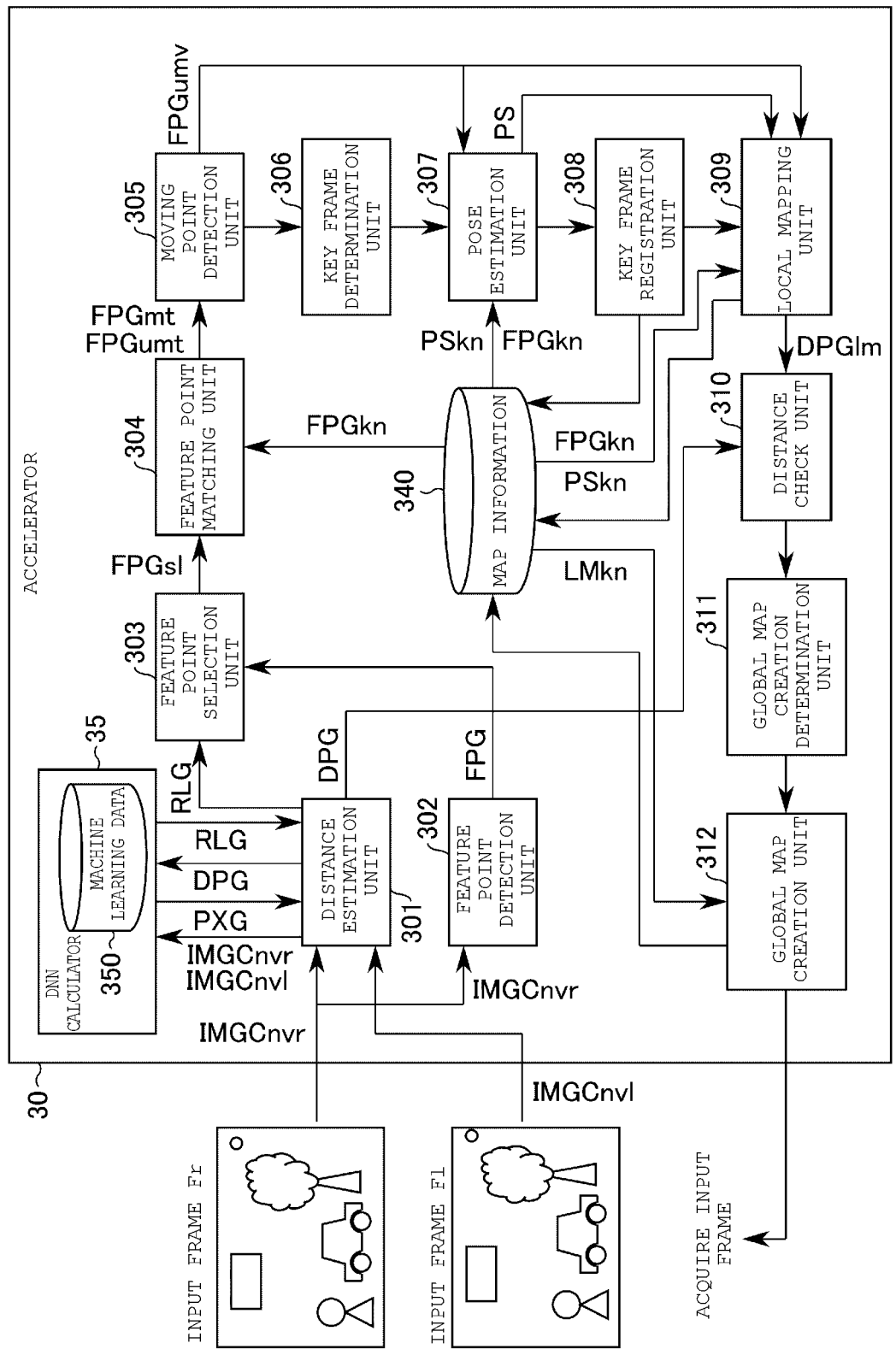
FIG. 15 is a block diagram depicting certain functional aspects of an accelerator in a motion estimation device according to a third embodiment.

The functional aspects of the accelerator 30 in the third embodiment will be described with reference to FIG. 15. FIG. 15 is a block diagram showing an example of the functional aspects of the accelerator 30 in the motion estimation device 1 according to the third embodiment. The functional aspects of the accelerator 30 shown in FIG. 15 are different from that of FIG. 4 of the first embodiment in that the distance estimation and the reliability region creation are performed by using a processed image IMGCnvr of an input frame Fr received from the receiving circuit 10 and a processed image IMGCnvl of an input frame Fl received from the receiving circuit 60. The other functional aspects of the accelerator 30 are the same as that of FIG. 4 shown for the first embodiment. In the distance estimation and the reliability creation, for example, the input frame Fr is employed as a reference frame, and the distance estimation and the reliability estimation of the distance are performed for each pixel of the processed image IMGCnvr of the input frame Fr. The feature point detection, the feature point selection, the feature point matching, the moving point detection, the key frame determination, the pose estimation, the key frame registration, the local mapping, the distance check, the global map creation determination, and the global map creation are performed in the same manner as in the first embodiment based on the processed image IMGCnvr of the input frame Fr for the input frame Fr, for example, with the input frame Fr as the reference frame. In the following, a case where the color camera is used as the cameras 2 and 4 will be described as an example. It is noted that the monochrome camera or the NIR camera may be used as the cameras 2 and 4.

Distance Estimation Unit 301

The distance estimation unit 301 receives the processed image IMGCnvr of the input frame Fr from the receiving circuit 10. The distance estimation unit 301 receives the processed image IMGCnvl of the input frame Fl from the receiving circuit 60. The distance estimation unit 301 stores the received processed images IMGCnvr and IMGCnvl in the RAM 34. The distance estimation unit 301 transmits the received processed images IMGCnvr and IMGCnvl to the DNN calculator 35. The DNN calculator 35 receives the processed images IMGCnvr and IMGCnvl from the distance estimation unit 301. The DNN calculator 35 analyzes the correspondence relationship with the machine learning data 350 for each pixel of the received processed images IMGCnvr and the IMGCnvl to calculate a corresponding pixel of the processed image IMGCnvl for each pixel of the processed image IMGCnvr.

When the learning data set used for learning the pixel value for each distance of the processed image is used as the machine learning data 350, the DNN calculator 35 analyzes a correspondence relationship (for example, all three pixel components match or one or two pixel components match) between the pixel value for each pixel of the processed images IMGCnvr and IMGCnvl and the pixel value of the machine learning data 350 to calculate the corresponding pixel of the processed image IMGCnvl for each pixel of the processed image IMGCnvr. In the following, a collection of one or more sets of calculated corresponding pixels is referred to as "corresponding pixel group PXG".

The DNN calculator 35 transmits the calculated corresponding pixel group PXG to the distance estimation unit 301. The distance estimation unit 301 receives the corresponding pixel group PXG from the DNN calculator 35. The distance estimation unit 301 stores the received corresponding pixel group PXG in the RAM 34. The distance estimation unit 301 calculates the distance at each pixel of the processed image IMGCnvr, for example, by triangulation based on the corresponding pixel group PXG received from the DNN calculator 35 and an interval between the camera 2 and the camera 4. The distance estimation unit 301 sets the calculated distance for each pixel of the processed image IMGCnvr as the estimated distance. Accordingly, the distance is estimated for each pixel of the processed image IMGCnvr. The distance estimation unit 301 stores the estimated distance group DPG in the RAM 34. The distance estimation unit 301 transmits the distance group DPG of the input frame Fr to the DNN calculator 35 and the distance check unit 310.

The DNN calculator 35 analyzes the correspondence relationship with the machine learning data 350 for each pixel of the processed image IMGCnvr to calculate the reliability of the distance. When the learning data set used for learning the pixel value for each distance of the processed image is used as the machine learning data 350, the DNN calculator 35 analyzes the closeness between the pixel value for each pixel of the processed image IMGCnvr and the pixel value of the machine learning data 350 to calculate the reliability of the distance, as in the second embodiment.

The DNN calculator 35 transmits the calculated reliability group RLG of the input frame Fr to the distance estimation unit 301. The distance estimation unit 301 receives the reliability group RLG from the DNN calculator 35. The distance estimation unit 301 sets the reliability of the received reliability group RLG as the created reliability for each pixel of the processed image IMGCnvr. Accordingly, the reliability is created for each pixel of the processed image IMGCnvr. The distance estimation unit 301 stores the received reliability group RLG in the RAM 34. The distance estimation unit 301 transmits the reliability group RLG of the input frame Fr to the feature point selection unit 303.

3.3 Effect

With the configuration according to the third embodiment, the same effect as that of the first embodiment is obtained.

4. Fourth Embodiment

The motion estimation device 1 according to a fourth embodiment will be described. The overall configuration of the motion estimation device 1 in the fourth embodiment is the same as that of FIG. 14 shown for the third embodiment. In the motion estimation device 1 according to the fourth embodiment, the distance estimation and the reliability estimation are different from those in the third embodiment. The accelerator 30 of the fourth embodiment lacks the DNN calculator 35 (FIG. 3) but a stereo matching unit 37 is provided. The flowchart showing the motion estimation operation in the fourth embodiment is the same as that of FIGS. 11 and 12. In the following, points different from those of the third embodiment will be primarily described.

4.1 Hardware Configuration of Accelerator 30 in Fourth Embodiment

Figure 16:
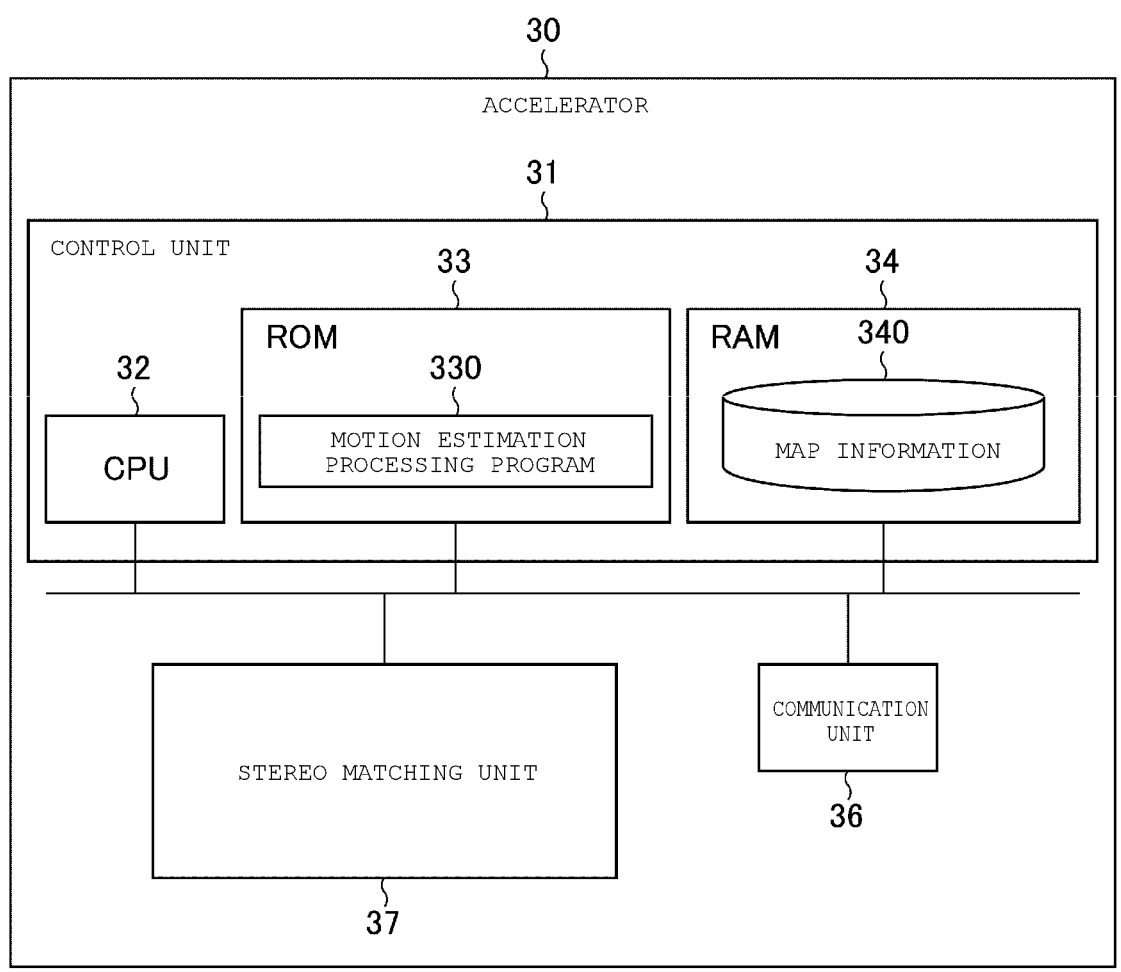
FIG. 16 is a block diagram of an accelerator in a motion estimation device according to a fourth embodiment.

FIG. 16 is a block diagram showing an example of the hardware configuration of the accelerator 30 in the motion estimation device 1 according to the fourth embodiment.

The accelerator 30 in the fourth embodiment includes a control unit 31, a stereo matching unit 37, and a communication unit 36.

The stereo matching unit 37 matches each pixel of the input frame Fr with each pixel of the input frame Fl. The stereo matching unit 37 calculates, for example, the reliability of the distance at each pixel of the input frame Fr based on a matching result. The other hardware configuration of the accelerator 30 is the same as that of FIG. 3 shown for the first embodiment.

4.2 Functional Aspects of Accelerator 30 in Fourth Embodiment

Figure 17:
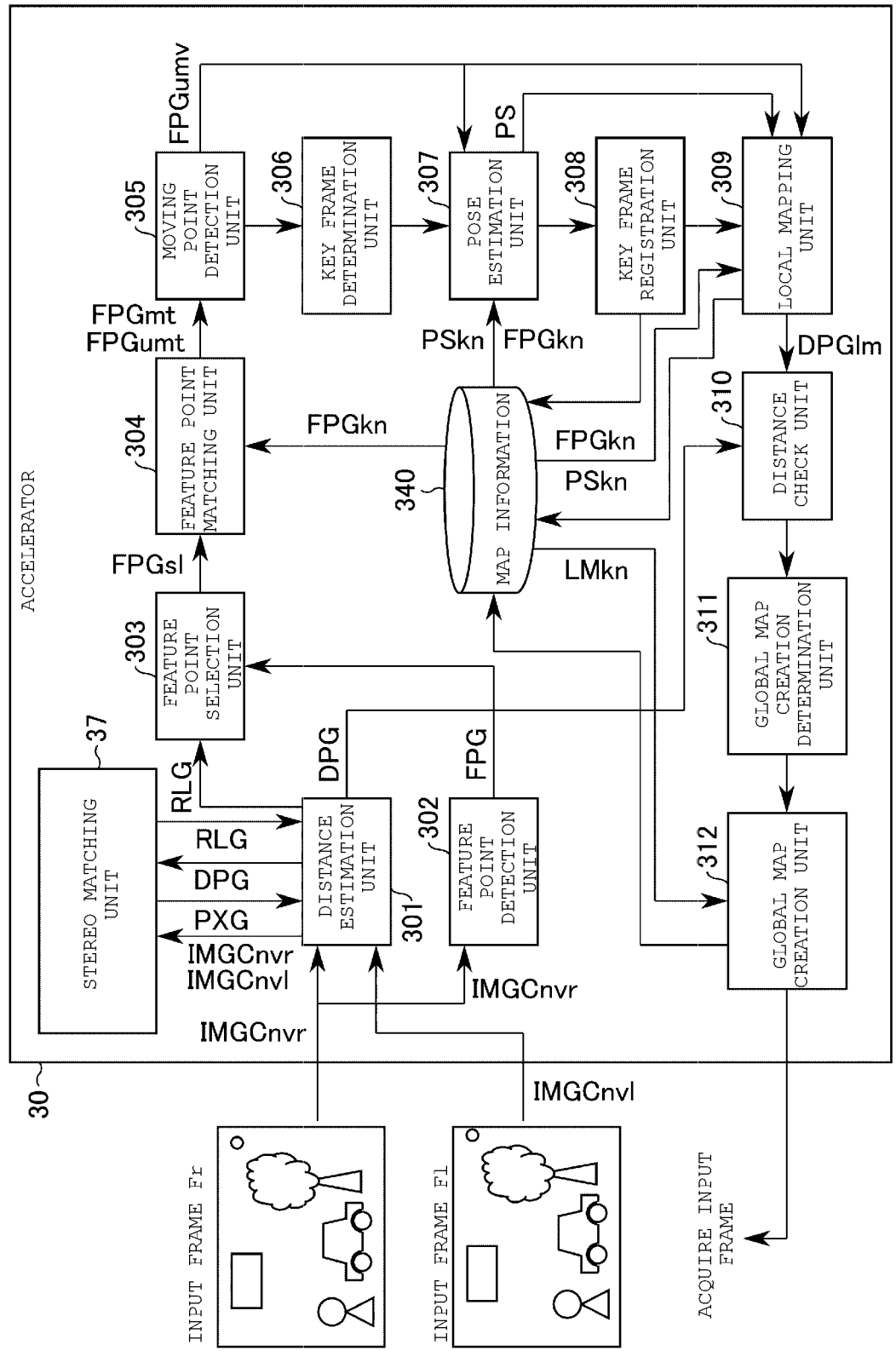
FIG. 17 is a block diagram depicting certain a functional aspects of an accelerator in a motion estimation device according to a fourth embodiment.

The functional aspects of the accelerator 30 of the fourth embodiment will be described with reference to FIG. 17. FIG. 17 is a block diagram showing an example of the functional aspects of the accelerator 30 in the motion estimation device 1 according to the fourth embodiment. The functional aspects of the accelerator 30 shown in FIG. 17 are different from that of FIG. 15 of the third embodiment in that the distance estimation and the reliability estimation are performed by using the stereo matching unit 37. The other functional aspects of the accelerator 30 in the fourth embodiment are the same as that of FIG. 15 shown for the third embodiment. In the following, a case where a color camera is used as the cameras 2 and 4 will be described as an example. It is noted that a monochrome camera or a NIR camera may be used as the cameras 2 and 4.

Distance Estimation Unit 301

The distance estimation unit 301 receives the processed image IMGCnvr of the input frame Fr from the receiving circuit 10. The distance estimation unit 301 receives the processed image IMGCnvl of the input frame Fl from the receiving circuit 60. The distance estimation unit 301 stores the received processed images IMGCnvr and IMGCnvl in the RAM 34. The distance estimation unit 301 transmits the received processed images IMGCnvr and IMGCnvl to the stereo matching unit 37. The stereo matching unit 37 receives the processed images IMGCnvr and IMGCnvl from the distance estimation unit 301. The stereo matching unit 37 calculates the corresponding pixel of the processed image IMGCnvl for each pixel of the processed image IMGCnvr based on the pixel value, using an algorithm such as semi-global-matching (SGM).

The stereo matching unit 37 transmits the calculated corresponding pixel group PXG to the distance estimation unit 301. The distance estimation unit 301 receives the corresponding pixel group PXG from the stereo matching unit 37. The distance estimation unit 301 stores the received corresponding pixel group PXG in the RAM 34. The distance estimation unit 301 calculates the distance at each pixel of the processed image IMGCnvr, as in the third embodiment, based on the corresponding pixel group PXG received from the stereo matching unit 37 and the interval between the camera 2 and the camera 4. The distance estimation unit 301 sets the calculated distance for each pixel of the processed image IMGCnvr as the estimated distance. Accordingly, the distance is estimated for each pixel of the processed image IMGCnvr. The distance estimation unit 301 stores the estimated distance group DPG in the RAM 34. The distance estimation unit 301 transmits the distance group DPG of the input frame Fr to the stereo matching unit 37 and the distance check unit 310.

The stereo matching unit 37 calculates (estimates) the reliability of the estimated distance for each pixel of the processed image IMGCnvr. For example, when the SGM is used, the stereo matching unit 37 calculates the reliability for the distance value for each pixel of the processed image IMGCnvr based on a cost function for each pixel. In this context, a cost function provides a value which corresponds to the amount resemblance (similarity) between each pixel in each of the two images of a stereo camera. A stereo matching algorithm selects matching (corresponding) pixels across the two stereo images based on cost function values.

The stereo matching unit 37 transmits the calculated reliability group RLG of the input frame Fr to the distance estimation unit 301. The distance estimation unit 301 receives the reliability group RLG from the stereo matching unit 37. The distance estimation unit 301 sets the reliability of the received reliability group RLG as the estimated reliability for each pixel of the processed image IMGCnvr. Accordingly, the reliability is created for each pixel of the processed image IMGCnvr. The distance estimation unit 301 stores the received reliability group RLG in the RAM 34. The distance estimation unit 301 transmits the reliability group RLG of the input frame Fr to the feature point selection unit 303.

4.3 Effect

With the configuration according to the fourth embodiment, the same effect as that of the first embodiment is obtained.

5. Modification and the Like

As described above, the motion estimation device according to the embodiment includes a first receiving circuit (10) that receives a first input frame (F) and a calculation circuit (30) that performs the motion estimation processing based on the first input frame. In the motion estimation processing, the calculation circuit performs the distance estimation in each pixel and the reliability estimation of the distance at each pixel based on information of each pixel in the first input frame (blur shape, pixel value, and signal value of captured image).

The embodiments are not limited to the forms described above, and various modifications may be made.

5.1 First Modification

A motion estimation device 1 according to a modification (first modification) of the first embodiment will be described. The overall configuration of the motion estimation device 1 in the first modification is the same as that of FIG. 1. In the motion estimation device 1 according to the first modification, the distance estimation and the reliability estimation are different from those in the first embodiment. The hardware configuration of the accelerator 30 in the first modification is the same as that of FIG. 3 shown for the first embodiment. The functional aspects of the accelerator 30 in the first modification is the same as that of FIG. 13 shown for the second embodiment. The processing flow of the motion estimation operation is the same as that of FIGS. 11 and 12 shown for the first embodiment. In the following, points different from that of the first embodiment will be primarily described.

5.1.1 Functional Aspects of Accelerator 30 in First Modification

The functional aspects of the accelerator 30 in the first modification will be described with reference to FIG. 13. In the following, a case where a color camera is used as a camera 2 will be described as an example. It is noted that a monochrome camera or a NIR camera may be used as the camera 2.

Distance Estimation Unit 301

The distance estimation unit 301 receives the processed image IMGCnv of the input frame F from the receiving circuit 10. The distance estimation unit 301 stores the received processed image IMGCnv in the RAM 34. The distance estimation unit 301 transmits the received processed image IMGCnv to the DNN calculator 35. The DNN calculator 35 receives the processed image IMGCnv from the distance estimation unit 301. The DNN calculator 35 analyzes the correspondence relationship with the machine learning data 350 for each pixel of the received processed image IMGCnv to calculate the distance.

When a learning data set that correlates a blur shape to each distance of the processed image is used as the machine learning data 350, the DNN calculator 35 analyzes a correspondence relationship (for example, exact match or partial match) between the blur shape for each pixel of the processed image IMGCnv and the blur shape of the machine learning data 350 to calculate the distance, as in the first embodiment.

The distance estimation unit 301 receives the calculated distance group DPG of the input frame F from the DNN calculator 35 and transmits the distance group DPG to the distance check unit 310, as in the first embodiment.

The DNN calculator 35 analyzes the correspondence relationship with the machine learning data 350 for each pixel of the processed image IMGCnv to calculate the reliability of the distance. When the learning data set that correlates the blur shape for each distance of the processed image is used as the machine learning data 350, the DNN calculator 35 analyzes closeness between the blur shape for each pixel of the processed image IMGCnv and the blur shape of the machine learning data 350 to calculate the reliability of the distance, as in the first embodiment.

The distance estimation unit 301 receives the calculated reliability group RLG of the input frame F from the DNN calculator 35 and transmits the reliability group RLG to the feature point selection unit 303, as in the first embodiment.

5.1.2 Effect

With the configuration according to the first modification, the same effect as that of the first embodiment is obtained.

5.2 Second Modification

The motion estimation device 1 according to a modification (second modification) of the second embodiment will be described. The overall configuration of the motion estimation device 1 in the second modification is the same as that of FIG. 1. In the motion estimation device 1 according to the second modification, the distance estimation and the reliability estimation are different from those in the second embodiment. The hardware configuration of the accelerator 30 in the second modification is the same as that of FIG. 3. The functional aspects of the accelerator 30 in the second modification are the same as that of FIG. 4. The processing flow of the motion estimation operation in this second modification is the same as that of FIGS. 11 and 12. In the following, points different from that of the first embodiment will be primarily described.

5.2.1 Functional Aspects of Accelerator 30 in Second Modification

A functional aspects of the accelerator 30 in the second modification will be described with reference to FIG. 4. In the following, a case where a monochrome camera is used as the camera 2 will be described as an example. It is noted that a NIR camera or a color camera may be used as the camera 2.

Distance Estimation Unit 301

The distance estimation unit 301 receives the captured image IMGRaw of the input frame F from the receiving circuit 10. The distance estimation unit 301 stores the received captured image IMGRaw in the RAM 34. The distance estimation unit 301 transmits the received captured image IMGRaw to the DNN calculator 35. The DNN calculator 35 receives the captured image IMGRaw from the distance estimation unit 301. The DNN calculator 35 analyzes the correspondence relationship with the machine learning data 350 for each pixel of the received captured image IMGRaw to calculate a distance.

When a learning data set that correlates a signal value of the captured image to each distance in the captured image is used as the machine learning data 350, the DNN calculator 35 analyzes a correspondence relationship (for example, exact match or partial match) between a signal value of the captured image for each pixel of the captured image IMGRaw and a signal value of the captured image of the machine learning data 350 to calculate the distance.

The distance estimation unit 301 receives the calculated distance group DPG of the input frame F from the DNN calculator 35 and transmits the distance group DPG to the distance check unit 310, as in the second embodiment.

The DNN calculator 35 analyzes the correspondence relationship with the machine learning data 350 for each pixel of the captured image IMGRaw to calculate the reliability of the distance. When the learning data set that correlates the signal value of the captured image to each distance in the captured image is used as the machine learning data 350, the DNN calculator 35 analyzes closeness between the signal value of the captured image for each pixel of the captured image IMGRaw and the signal value of the captured image of the machine learning data 350 to calculate the reliability of the distance. When a corresponding signal value of the captured image in the captured image IMGRaw is analyzed and found not to be close to a corresponding signal value of the captured image of the machine learning data 350, the DNN calculator 35 calculates the high reliability. On the other hand, when the corresponding signal value of the captured image in the captured image IMGRaw is analyzed and found not to be close to the corresponding signal value of the captured image of the machine learning data 350, the DNN calculator 35 calculates the low reliability.

The distance estimation unit 301 receives the calculated reliability group RLG of the input frame F from the DNN calculator 35 and transmits the reliability group RLG to the feature point selection unit 303, as in the second embodiment.

5.2.2 Effect

With the configuration according to the second modification, the same effect as that of the first embodiment is obtained.

5.3 Third Modification

The motion estimation device 1 according to a modification (third modification) of the third embodiment will be described. The overall configuration of the motion estimation device 1 in the third modification is the same as that of FIG. 14 shown for the third embodiment. In the motion estimation device 1 according to the third modification, the distance estimation and the reliability estimation are different from those in the third embodiment. The hardware configuration of the accelerator 30 in the third modification is the same as that of FIG. 3 shown for the first embodiment. The processing flow of the motion estimation operation is the same in this third modification as that of FIGS. 11 and 12 shown for the first embodiment. In the following, points different from those of the third embodiment will be primarily described.

5.3.1 Functional Aspects of Accelerator 30 in Third Modification

Figure 18:
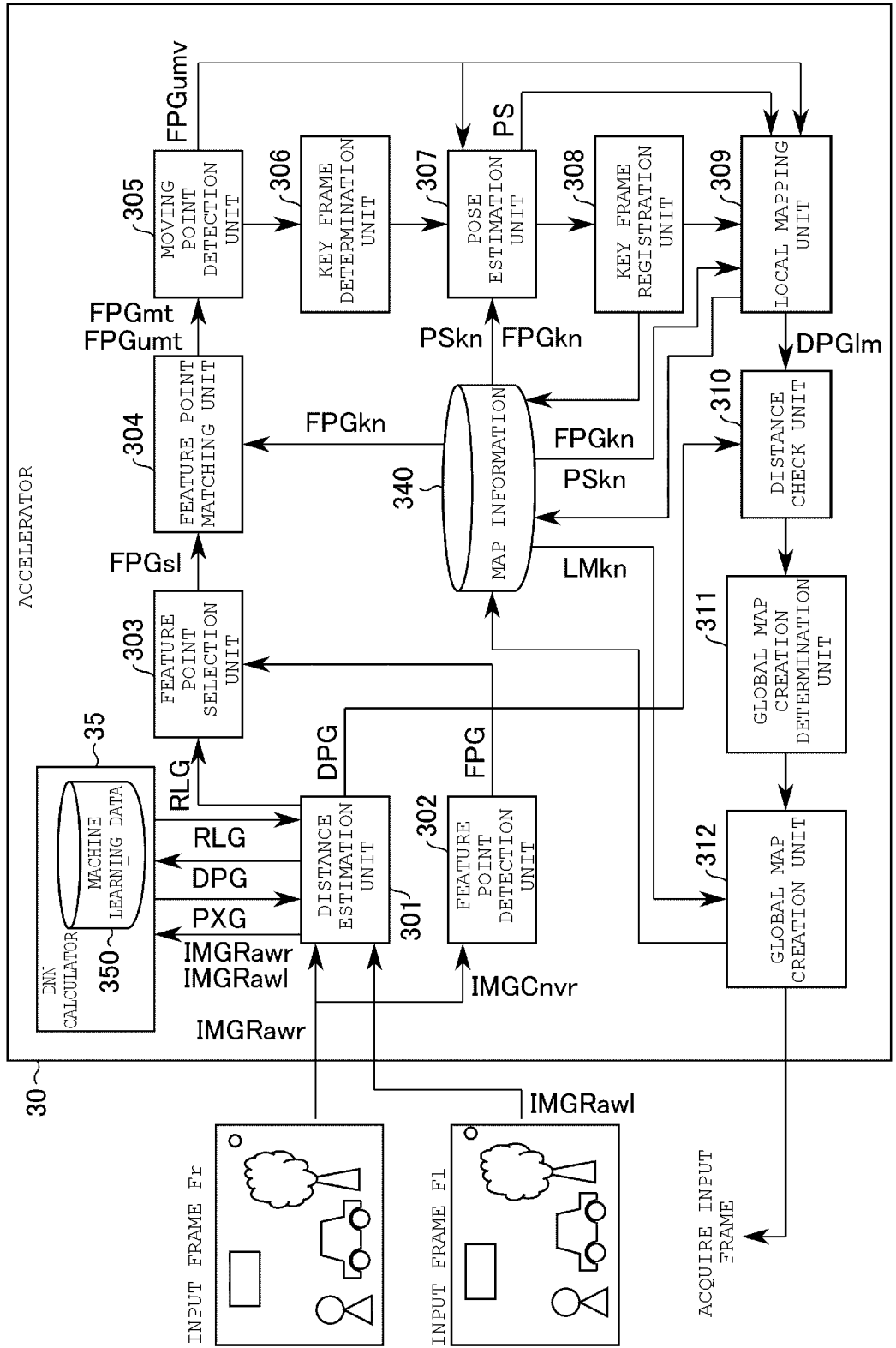
FIG. 18 is a block diagram depicting certain functional aspects of an accelerator in a motion estimation device according to one modification.

The functional aspects of the accelerator 30 in the third modification will be described with reference to FIG. 18. FIG. 18 is a block diagram showing an example of the functional aspects of the accelerator 30 in the motion estimation device 1 according to the third modification. The functional aspects of the accelerator 30 shown in FIG. 18 are different from that of FIG. 15 shown for the third embodiment in that the distance estimation unit 301 performs the distance estimation and the reliability estimation using a captured image IMGRawr of the input frame Fr and a captured image IMGRawl of the input frame Fl. The other functional aspects of the accelerator 30 are the same as that of FIG. 15 shown for the third embodiment. In the following, a case where a monochrome camera is used as the cameras 2 and 4 will be described as an example. It is noted that a NIR camera or a color camera may be used as the cameras 2 and 4.

Distance Estimation Unit 301

The distance estimation unit 301 receives the captured image IMGRawr of the input frame Fr from the receiving circuit 10. The distance estimation unit 301 receives the captured image IMGRawl of the input frame Fl from the receiving circuit 60. The distance estimation unit 301 stores the received captured images IMGRawr and IMGRawl in the RAM 34. The distance estimation unit 301 transmits the received captured images IMGRawr and IMGRawl to the DNN calculator 35. The DNN calculator 35 receives the captured images IMGRawr and IMGRawl from the distance estimation unit 301. The DNN calculator 35 analyzes a correspondence relationship with the machine learning data 350 for each pixel of the received captured images IMGRawr and the IMGRawl to calculate a corresponding pixel of the captured image IMGRawl for each pixel of the captured image IMGRawr.

When the learning data set that correlates the signal value of the captured image to each distance in the captured image is used as the machine learning data 350, the DNN calculator 35 analyzes a correspondence relationship (for example, exact match or partial match) between a signal value of the captured image for each pixel of the captured images IMGRawr and IMGRawl and the signal value of the captured image of the machine learning data 350 to calculate the corresponding pixel of the captured image IMGRawl for each pixel of the captured image IMGRawr.

The distance estimation unit 301 receives the calculated corresponding pixel group PXG from the DNN calculator 35 and calculates the distance group DPG of the input frame Fr based on the received corresponding pixel group PXG and the interval between the camera 2 and the camera 4, as in the third embodiment. The distance estimation unit 301 transmits the calculated distance group DPG to the DNN calculator 35 and the distance check unit 310, as in the third embodiment.

The DNN calculator 35 analyzes the correspondence relationship with the machine learning data 350 for each pixel of the captured image IMGRawr to calculate the reliability of the distance. When the learning data set that correlates the signal value of the captured image to each distance in the captured image is used as the machine learning data 350, the DNN calculator 35 analyzes closeness between a signal value of the captured image for each pixel of the captured image IMGRawr and the signal value of the captured image of the machine learning data 350 to calculate the reliability of the distance, as in the second modification.

The distance estimation unit 301 receives the calculated reliability group RLG of the input frame Fr from the DNN calculator 35 and transmits the reliability group RLG to the feature point selection unit 303, as in the third embodiment.

5.3.2 Effect

With the configuration according to the third modification, the same effect as that of the first embodiment is obtained.

5.4 Fourth Modification

The motion estimation device 1 according to a modification (fourth modification) of the fourth embodiment will be described. The overall configuration of the motion estimation device 1 in the fourth modification is the same as that of FIG. 14 shown for the third embodiment. In the motion estimation device 1 according to the fourth modification, the distance estimation and the reliability estimation are different from those in the fourth embodiment. The hardware configuration of the accelerator 30 in the fourth modification is the same as that of FIG. 16 shown for the fourth embodiment. The processing flow of the motion estimation operation in the fourth modification is the same as that of FIGS. 11 and 12 shown for the first embodiment. In the following, points different from the fourth embodiment will be primarily described.

5.4.1 Functional Configuration of Accelerator 30

Figure 19:
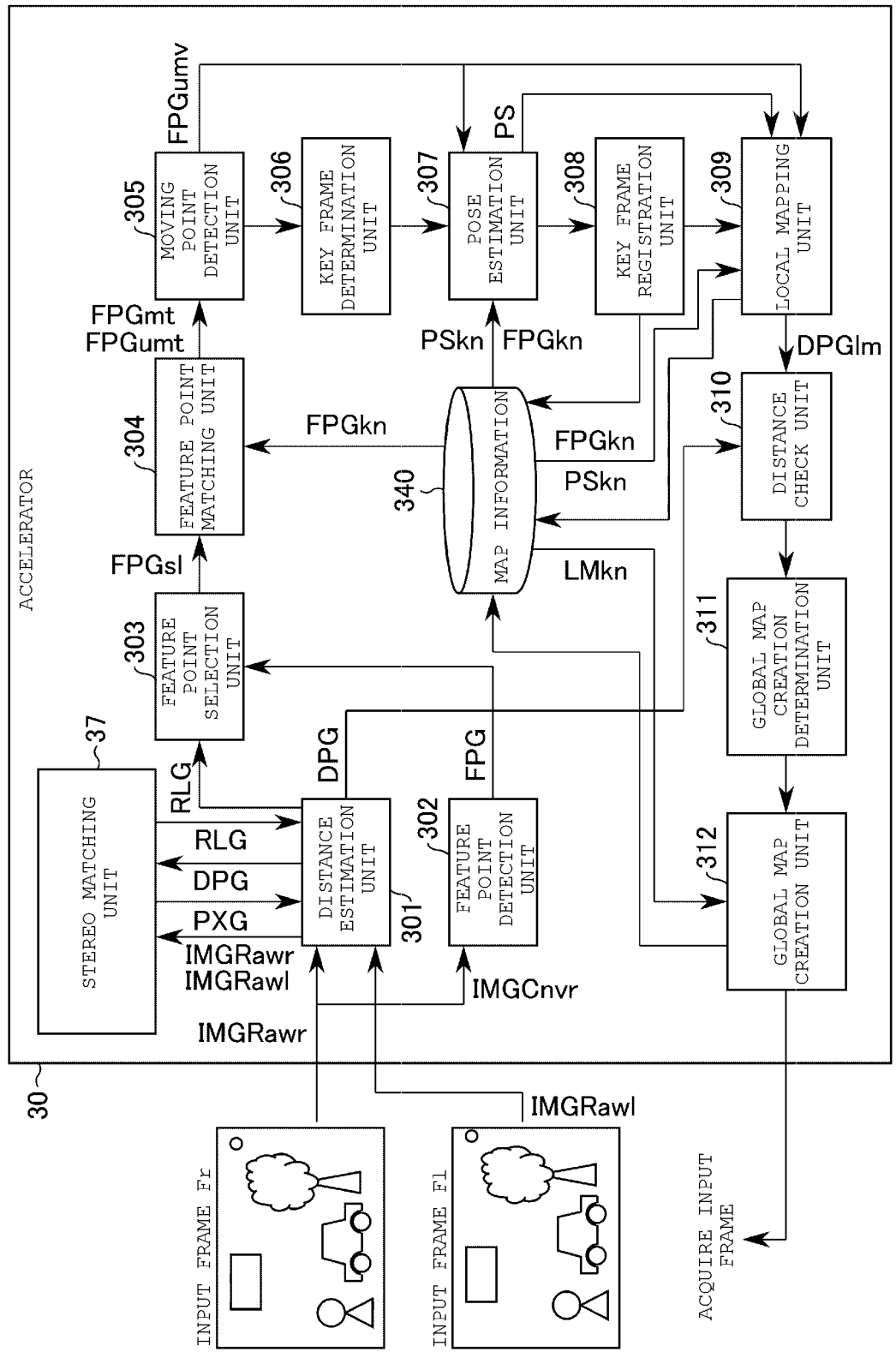
FIG. 19 is a block diagram depicting certain functional aspects of an accelerator in a motion estimation device according to another modification.

The functional aspects of the accelerator 30 will be described with reference to FIG. 19. FIG. 19 is a block diagram showing an example of the functional aspects of the accelerator 30 in the motion estimation device 1 according to the fourth modification. The functional aspects of the accelerator 30 shown in FIG. 19 are different from that of FIG. 17 shown for the fourth embodiment in that the distance estimation unit 301 performs the distance estimation and the reliability estimation using the captured image IMGRawr of the input frame Fr and the captured image IMGRawl of the input frame Fl. The other functional aspects of the accelerator 30 in the fourth modification are the same as that of FIG. 17 shown for the fourth embodiment. In the following, a case where a monochrome camera is used as the cameras 2 and 4 will be described as an example. It is noted that a NIR camera or a color camera may be used as the cameras 2 and 4.

Distance Estimation Unit 301

The distance estimation unit 301 receives the captured image IMGRawr of the input frame Fr from the receiving circuit 10. The distance estimation unit 301 receives the captured image IMGRawl of the input frame Fl from the receiving circuit 60. The distance estimation unit 301 stores the received captured images IMGRawr and IMGRawl in the RAM 34. The distance estimation unit 301 transmits the received captured images IMGRawr and IMGRawl to the stereo matching unit 37. The stereo matching unit 37 receives the captured images IMGRawr and IMGRawl from the distance estimation unit 301. The stereo matching unit 37 calculates the corresponding pixel of the captured image IMGRawl for each pixel of the captured image IMGRawr based on the signal value of the captured image, using an algorithm such as the SGM.

The distance estimation unit 301 receives the calculated corresponding pixel group PXG from the stereo matching unit 37 and calculates the distance group DPG of the input frame Fr based on the received corresponding pixel group PXG and the interval between the camera 2 and the camera 4, as in the fourth embodiment. The distance estimation unit 301 transmits the calculated distance group DPG to the stereo matching unit 37 and the distance check unit 310, as in the fourth embodiment.

The stereo matching unit 37 calculates the reliability of the distance for each pixel of the captured image IMGRawr. For example, when the SGM is used, the stereo matching unit 37 calculates the reliability of the distance for each pixel of the captured image IMGRawr based on the cost function for each pixel, as in the fourth embodiment.

The distance estimation unit 301 receives the calculated reliability group RLG of the input frame Fr from the stereo matching unit 37 and transmits the reliability group RLG to the feature point selection unit 303, as in the fourth embodiment.

5.4.2 Effect

With the configuration according to the fourth modification, the same effect as that of the first embodiment is obtained.

5.5 Fifth Modification

The motion estimation device 1 according to a modification (fifth modification) of the first embodiment will be described. The overall configuration of the motion estimation device 1 in the fifth modification is the same as that of FIG. 1 shown for the first embodiment. In the motion estimation device 1 according to the fifth modification, the feature point detection is different from that of the first embodiment. The hardware configuration of the accelerator 30 in the fifth modification is the same as that of FIG. 3 shown for the first embodiment. processing flow of the motion estimation operation is the same as that of FIGS. 11 and 12 shown for the first embodiment. In the following, points different from that of the first embodiment will be primarily described.

5.5.1 Functional Configuration of Accelerator 30 in Fifth Modification

Figure 20:
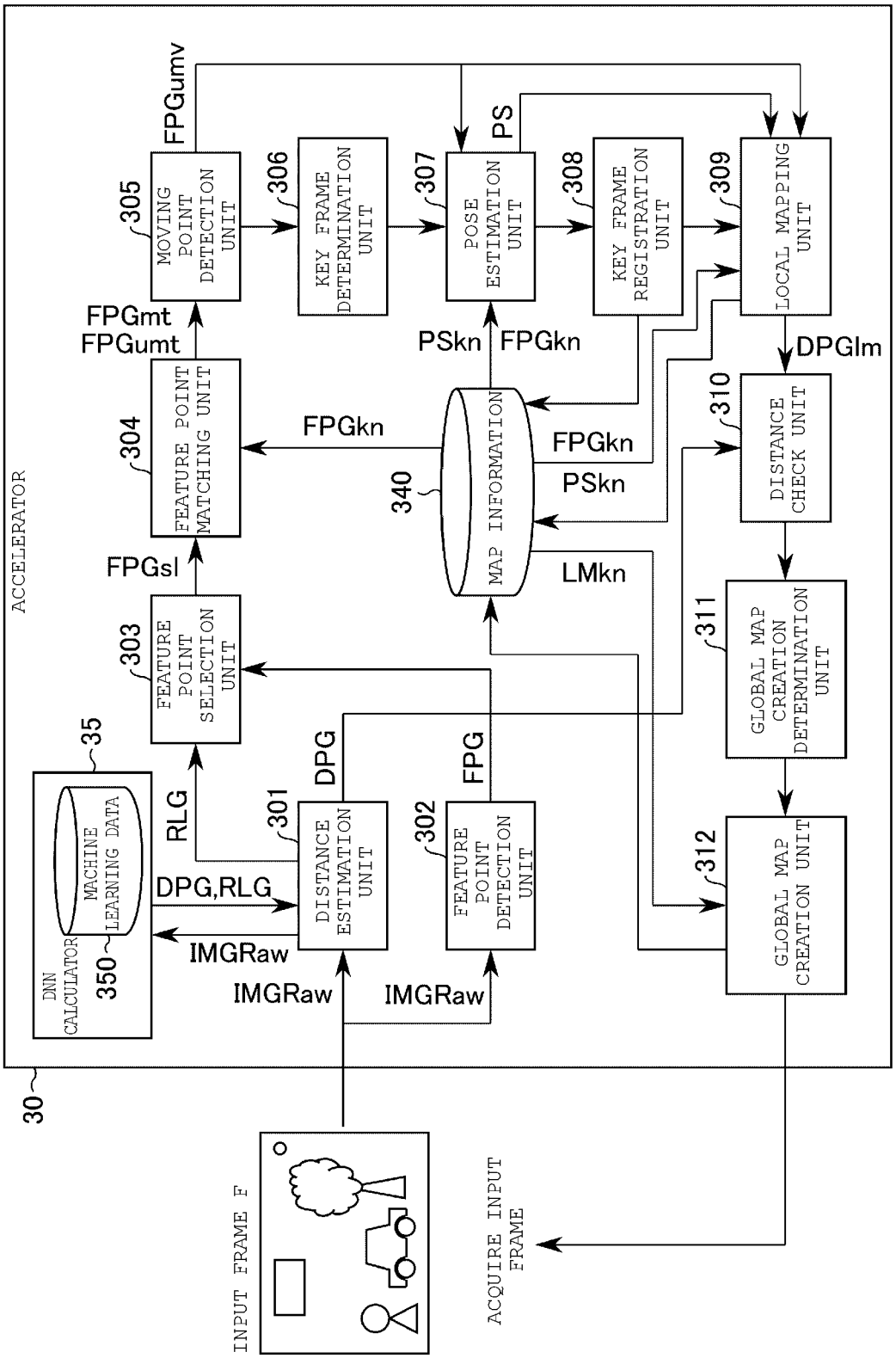
FIG. 20 is a block diagram depicting certain functional aspects of an accelerator in a motion estimation device according to yet another modification.

The functional aspects of the accelerator 30 will be described with reference to FIG. 20. FIG. 20 is a block diagram showing an example of the functional aspects of the accelerator 30 in the motion estimation device 1 according to the fifth modification. The functional aspects of the accelerator 30 shown in FIG. 20 are different from that of FIG. 4 shown for the first embodiment in that the feature point detection unit 302 performs the feature point detection using the captured image IMGRaw of the input frame F. The other functional aspects of the accelerator 30 are the same as that of FIG. 4 shown for the first embodiment. In the following, a case where the monochrome camera is used as the camera 2 will be described as an example. It is noted that a NIR camera or a color camera may be used as the camera 2.

Feature Point Detection Unit 302

The feature point detection unit 302 receives the captured image IMGRaw of the input frame F from the receiving circuit 10. The feature point detection unit 302 detects the feature point based on received captured image IMGRaw. The feature point detection unit 302 detects the feature point based on the signal value of the captured image in each pixel of the captured image IMGRaw, using an algorithm such as SIFT or SURF.

The feature point detection unit 302 transmits the detected feature point group FPG of the input frame F to the feature point selection unit 303, as in the first embodiment.

5.5.2 Effect

With the configuration according to the fifth modification, the same effect as that of the first embodiment is obtained. Of course, the fifth modification may also be applied to the second to fourth embodiments as well as the first to fourth modifications.

5.6 Other Modifications

The machine learning data 350 is not limited to a data set as described above.

The distance estimation unit 301 may have the function of the DNN calculator 35.

In the flowchart of FIGS. 11 and 12, the order of the processing may be changed. For example, the order of the distance estimation (S11) and the reliability estimation (S12) may be reversed. In some examples, the distance estimation (S11), the reliability estimation (S12), and the feature point detection (S13) may be executed in parallel. Likewise in some examples, the distance check (S21) may be omitted.

When the cameras 2 and 4 are used, the feature point group of the input frame Fl may be detected in addition to the detection of the feature point group of the input frame Fr. In this case, the feature point group FPG of the input frame Fr can be detected based on results of the detection.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A motion estimation device, comprising:
a first receiving circuit configured to receive a first input frame; and
a calculation circuit configured to perform motion estimation processing based on the first input frame, wherein
in the motion estimation processing, the calculation circuit estimates a distance for each pixel of the first input frame and estimates a reliability of the distance for each pixel of the first input frame based on pixel information of the first input frame, and
in the motion estimation processing, the calculation circuit is configured to:
detect a first feature point in the first input frame, and
select the first feature point as a second feature point if the estimated reliability of the distance for the pixel corresponding to first feature point is greater than or equal to a first reference value.

2. The motion estimation device according to claim 1, wherein, in the motion estimation processing, the calculation circuit is configured to:
compare the second feature point to a third feature point in a key frame registered before the first input frame,
select the second feature point as a fourth feature point if the second feature point and the third feature point do not match, and
detect the fourth feature point as a moving point in the first input frame if the fourth feature point is in a predetermined region of the first input frame.

3. The motion estimation device according to claim 2, wherein, in the motion estimation processing, the calculation circuit is configured to:
detect the fourth feature point as a non-moving point in the first input frame if the fourth feature point is not in the predetermined region of the first input frame,
detect the second feature point as a non-moving point in the first input frame if the second feature point and the third feature point match, and
calculate a distance to the non-moving point.

4. The motion estimation device according to claim 3, wherein the calculation circuit is further configured to:
compare the estimated distance for each pixel of the first input frame to the calculated distance of the non-moving point.

5. The motion estimation device according to claim 1, wherein the calculation circuit estimates the distance for each pixel of the first input frame and estimates the reliability of the distance for each pixel of the first input frame based on the pixel information of the first input frame and machine learning data.

6. The motion estimation device according to claim 5, wherein
the first input frame is an image captured by a camera,
the pixel information of each pixel of the first input frame is a blur shape for each pixel, and
the machine learning data includes blur shapes corresponding to various distances in the image.

7. The motion estimation device according to claim 5, wherein
the first input frame is a full-color image,
the pixel information of the first input frame is a pixel value, and
the machine learning data includes pixel values corresponding to various distances in the full-color image.

8. The motion estimation device according to claim 1, wherein the distance for each pixel of the first input frame is a distance between a subject and a camera that provides the first input frame to the first receiving circuit.

9. The motion estimation device according claim 1, further comprising:
a second receiving circuit configured to receive a second input frame, wherein
the calculation circuit, in the motion estimation processing, is further configured to:
estimate the distance for each pixel of the first input frame and estimate the reliability of the estimated distance for each pixel of the first input frame based on pixel information of the second input frame in addition to the pixel information of the first input frame.

10. The motion estimation device according to claim 1, wherein, in the motion estimation processing, the calculation circuit is configured to:
generate a map using the second feature point and the distance for the pixel corresponding to the second feature point.

11. A motion estimation method for a motion estimation device, the method comprising:
receiving a first input frame;
estimating a distance for each pixel of the first input frame;
estimating a reliability of the distance for each pixel of the first input frame based on pixel information of the first input frame;
detecting a first feature point in the first input frame; and
selecting the first feature point as a second feature point if the estimated reliability of the distance for the pixel corresponding to first feature point is greater than or equal to a first reference value.

12. The motion estimation method according to claim 11, further comprising:
comparing the second feature point to a third feature point in a key frame registered before the first input frame;
selecting the second feature point as a fourth feature point if the second feature point and the third feature point do not match; and
detecting the fourth feature point as a moving point in the first input frame if the fourth feature point is in a predetermined region of the first input frame.

13. The motion estimation method according to claim 12, further comprising:
detecting the fourth feature point as a non-moving point in the first input frame if the fourth feature point is not in the predetermined region of the first input frame;
detecting the second feature point as a non-moving point in the first input frame if the second feature point and the third feature point match; and
calculating a distance to the non-moving point.

14. The motion estimation method according to claim 13, further comprising:
comparing the estimated distance for each pixel of the first input frame to the calculated distance of the non-moving point.

15. The motion estimation method according to claim 11, wherein the estimating of the distance for each pixel of the first input frame and the estimating of the reliability of the distance for each pixel of the first input frame is based on the pixel information of the first input frame and machine learning data.

16. The motion estimation method according to claim 11, wherein the distance for each pixel of the first input frame is a distance between a subject and a camera that provides the first input frame.

17. The motion estimation method according claim 11, further comprising:
receiving a second input frame, wherein
the estimating of the distance for each pixel of the first input frame and the estimating of the reliability of the estimated distance for each pixel of the first input frame is based on pixel information of the second input frame in addition to the pixel information of the first input frame.

18. A motion estimation device, comprising:
a first receiving circuit configured to receive a first input frame;
a second receiving circuit configured to receive a second input frame; and
a calculation circuit configured to perform motion estimation processing based on the first input frame, wherein
in the motion estimation processing, the calculation circuit estimates a distance for each pixel of the first input frame and estimates a reliability of the distance for each pixel of the first input frame based on pixel information of the first input frame, and
the calculation circuit, in the motion estimation processing, is further configured to:
estimate the distance for each pixel of the first input frame and estimate the reliability of the estimated distance for each pixel of the first input frame based on pixel information of the second input frame in addition to the pixel information of the first input frame.

19. The motion estimation device according to claim 18, wherein the calculation circuit estimates the distance for each pixel of the first input frame and estimates the reliability of the distance for each pixel of the first input frame based additionally on machine learning data.

20. The motion estimation device according to claim 18, wherein, in the motion estimation processing, the calculation circuit is configured to:
detect a first feature point in the first input frame,
select the first feature point as a second feature point if the estimated reliability of the distance for the pixel corresponding to first feature point is greater than or equal to a first reference value, and
generate a map using the second feature point and the distance for the pixel corresponding to the second feature point.

* * * * *